(12) United States Patent
Gehrmann

(10) Patent No.: US 10,932,128 B2
(45) Date of Patent: Feb. 23, 2021

(54) SYSTEMS AND METHODS FOR SECURE DEVICE PROVISIONING

(71) Applicant: PCMS Holdings, Inc., Wilmington, DE (US)

(72) Inventor: Christian M. Gehrmann, Lund (SE)

(73) Assignee: PCMS Holdings, Inc., Wilmington, DE (US)

( * ) Notice: Subject to any disclaimer, the term of this patent is extended or adjusted under 35 U.S.C. 154(b) by 182 days.

(21) Appl. No.: 15/511,766

(22) PCT Filed: Sep. 17, 2015

(86) PCT No.: PCT/US2015/050714
§ 371 (c)(1),
(2) Date: Mar. 16, 2017

(87) PCT Pub. No.: WO2016/093912
PCT Pub. Date: Jun. 16, 2016

(65) Prior Publication Data
US 2017/0295491 A1 Oct. 12, 2017

Related U.S. Application Data

(60) Provisional application No. 62/052,817, filed on Sep. 19, 2014.

(51) Int. Cl.
*H04L 9/00* (2006.01)
*H04W 12/06* (2021.01)
(Continued)

(52) U.S. Cl.
CPC ............. *H04W 12/06* (2013.01); *H04W 4/70* (2018.02); *H04W 12/0023* (2019.01);
(Continued)

(58) Field of Classification Search
CPC ................................ G06F 21/00; H04L 12/00
See application file for complete search history.

(56) References Cited

U.S. PATENT DOCUMENTS 8,407,769 B2 3/2013 Salmela et al.
8,516,133 B2 8/2013 Smeets et al.
(Continued)

OTHER PUBLICATIONS

3GPP, "Feasibility Study on the Security Aspects of Remote Provisioning and Change of Subscription for Machine to Machine (M2M) Equipment", Specification #: 33.812, Available at <http://www.3gpp.org/DynaReport/33812.htm>, retrieved on Sep. 22, 2017, 01 page.

(Continued)

*Primary Examiner* — Joseph P Hirl
*Assistant Examiner* — Leynna Truvan
(74) *Attorney, Agent, or Firm* — Condo Roccia Koptiw LLP

(57) ABSTRACT

Systems, methods, and/or techniques for providing access network independent device provisioning of machine-to-machine (M2M) devices belonging to different M2M application domains may be disclosed. For example, a unique reference to a preliminary M2M ID module (PMI) associated with a M2M device. The M2M device with the PMI may be registered at a M2M ID provider (MIP). A M2M ID (MI) to replace the PMI may be generated using the MIP Additionally, a secure mutually authenticated communication channel may be set up with the M2M device within an application domain and/or may be provided for secure authorization of requests to the M2M device using the MI.

10 Claims, 26 Drawing Sheets

(51) Int. Cl.
 *H04W 4/70* (2018.01)
 *H04W 12/04* (2021.01)
 *H04W 12/00* (2021.01)
(52) U.S. Cl.
 CPC ..... *H04W 12/04* (2013.01); *H04W 12/04031* (2019.01); *H04W 12/00518* (2019.01)

(56) References Cited

U.S. PATENT DOCUMENTS

| | | | |
|---|---|---|---|
| 10,200,353 B2 * | 2/2019 | Seed | H04L 67/10 |
| 2008/0260149 A1 | 10/2008 | Gehrmann | |
| 2009/0217348 A1 * | 8/2009 | Salmela | H04W 4/70 726/2 |
| 2009/0253409 A1 * | 10/2009 | Slavov | H04L 63/0823 455/411 |
| 2011/0314287 A1 | 12/2011 | Escott et al. | |
| 2012/0047558 A1 | 2/2012 | Sundaram et al. | |

OTHER PUBLICATIONS

3rd Generation Partnership Project (3GPP), TR 33.812 V0.3.0, "Technical Specification Group Services and System Aspects, Feasibility Study on Remote Management of USIM Application on M2M Equipment, (Release 8)", May 2008, 61 pages.
3rd Generation Partnership Project (3GPP), TS 33.220 V12.2.0, "Technical Specification Group Services and System Aspects, Generic Authentication Architecture (GAA), Generic Bootstrapping Architecture (GBA) (Release 12)", Dec. 2013, 92 pages.
Aboba et al., "Extensible Authentication Protocol (EAP)", Network Working Group, RFC: 3748, Jun. 2004, 67 pages.
Cooper et al., "Internet X.509 Public Key Infrastructure Certificate and Certificate Revocation List (CRL) Profile", Network Working Group, RFC: 5280, May 2008, 151 pages.
Dierks et al., "The Transport Layer Security (TLS) Protocol Version 1.2", Network Working Group, RFC 5246, Aug. 2008, 92 pages.
Eronen et al., "Pre-Shared Key Ciphersuites for Transport Layer Security (TLS)", Network Working Group, RFC: 4279, Dec. 2005, 15 pages.
European Telecommunications Standards Institute (ETSI), ETSI TS 102 690 V2.1.1, "Technical Specification, Machine-to-Machine Communications (M2M), Functional Architecture", Oct. 2013, 332 pages.
GSMA, "Embedded SIM Remote Provisioning Architecture Version 1.1", Official Document 12FAST.13-Embedded SIM Remote Provisioning Architecture, Dec. 17, 2013, 84 pages.
Heer et al., "Security Challenges in the IP-Based Internet of Things", Wireless Personal Communications, vol. 61, No. 3, Dec. 2011, pp. 1-16 (527-542).

IEEE, "IEEE Standard for Local and Metropolitan Area Networks—Part 15.4: Low-Rate Wireless Personal Area Networks (LR-WPANs)", IEEE Std 802.15.4™-2011, Sep. 5, 2011, 314 pages.
IEEE, IEEE Standard for Information technology—Telecommunications and information exchange between systems—Local and metropolitan area networks—Specific requirements Part 3: Carrier Sense Multiple Access with Collison Detection (CSMA/CD) Access Method and Physical Layer Specifications Amendment: Data Terminal Equipment (DTE) Power via Media Dependent Interface (MDI), IEEE 802.3af, Jun. 2003, 133 pages.
IETF, "Constrained RESTful Environments (core)", Available at <https://datatracker.ietf.org/wg/core/documents>, retrieved on Sep. 22, 2017, 3 pages.
Kaufman, C., "Internet Key Exchange (IKEv2) Protocol", The Internet Engineering Task Force (IETF), Network Working Group, RFC: 4306, Dec. 2005, 99 pages.
Kent et al., "Security Architecture for the Internet Protocol", Network Working Group, RFC: 4301, Dec. 2005, 101 pages.
ONEM2M, "Architecture Analysis—Part 2: Study for the Merging of Architectures Proposed for Consideration by OneM2M", oneM2M-TR-0003-Architecture_Analysis_Part_2-V-0.5.0, Jul. 28, 2013, 12 pages.
ONEM2M, "Architecture Analysis—Part 1: Analysis of Architectures Proposed for Consideration by oneM2M", oneM2M-TR-0002-Architecture_Analysis_Part_1-V-0.2.0, Jul. 28, 2013, 70 pages.
ONEM2M, "OneM2M-Requirements Technical Specification", oneM2M-TS-0002-V-0.6.2, Oct. 17, 2013, 28 pages.
Open Mobile Alliance, "OMA Device Management Protocol", Candidate Version 2.0, Dec. 10, 2013, 104 pages.
Rescorla et al., "Datagram Transport Layer Security", Network Working Group, RFC: 4347, Apr. 2006, 25 pages.
RSA, "PKCS #11: Cryptographic Token Interface Standard", Available at <http://www.emc.com/emc-plus/rsa-labs/standards-initiatives/pkcs-11-cryptographic-token-interface-standard.htm>, retrieved on Sep. 22, 2017, 5 pages.
Seitz et al., "Additional Security Modes for CoAP", CoRE Working Group, draft-seitz-core-security-modes-00, Oct. 21, 2013, 14 pages.
Seitz et al., "Authorization Framework for the Internet-of-Things", IEEE 14th International Symposium and Workshops on a World of Wireless, Mobile and Multimedia Networks (WoWMoM), Madrid, Spain, Jun. 4-7, 2013, 6 pages.
Seitz et al., "Design Considerations for Security Protocols in Constrained Environments", CoRE Working Group, draft-seitz-ace-design-considerations-00, Feb. 14, 2014, 14 pages.
Wouters et al., "Using Raw Public Keys in Transport Layer Security (TLS) and Datagram Transport Layer Security (DTLS)", TLS, Internet-Draft, draft-ietf-tls-oob-pubkey-11.txt, Jan. 18, 2014, 17 pages.

* cited by examiner

SYSTEMS AND METHODS FOR SECURE DEVICE PROVISIONING

CROSS-REFERENCE TO RELATED APPLICATIONS

This application is the National Stage Entry under 35 U.S.C. § 371 of Patent Cooperation Treaty Application No. PCT/US2015/050714, filed Sep. 17, 2015, which claims the benefit of U.S. Provisional Application No. 62/052,817, filed Sep. 19, 2014, the disclosures of which are incorporated herein by reference in their entirety.

BACKGROUND

Machine to Machine (M2M) communication (M2M) may be an Internet paradigm that may be used to remotely configure and control a very large amount of electronic equipment and may open up additional possibilities with respect to services such as automotive, industry control, traffic management and building automation, may reduce cost for maintenance, surveillance, production, transport and communications, and/or the like. However, configuration and/or control using M2M communication and/or units or devices may not be possible if the principles for configuring and updating the M2M units or devices themselves may not be secure and/or efficient in terms of device management (DM) routines and principles. Unfortunately, current systems do not provide such efficient and/or secure M2M device or unit provisioning that may be desired.

SUMMARY

Systems, methods, and/or techniques for providing access network independent device provisioning of machine-to-machine (M2M) devices belonging to different M2M application domains may be disclosed. For example, a unique reference to a preliminary M2M ID module (PMI) associated with a M2M device. The M2M device with the PMI may be registered at a M2M ID provider (MIP). A M2M ID (MI) to replace the PMI may be generated using the MIP. Additionally, a secure mutually authenticated communication channel may be set up with the M2M device within an application domain and/or may be provided for secure authorization of requests to the M2M device using the MI.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to the examples herein that may solve one or more disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments may now be described with reference to the various Figures. Although this description provides a detailed example of possible implementations, it should be noted that the details are intended to be exemplary and in no way limit the scope of the examples described herein.

As described herein, machine-to-machine (M2M) communication may be an Internet paradigm that may change technology. For example, the possibility to remotely configure and control a very large amount of electronic equipment with M2M may open up additional and/or new possibilities with respect to services such as automotive, industry control, traffic management, building automation, and/or the like and may reduce cost for maintenance, surveillance, production, transport and communications, and/or the like. However, this may be achieved if the principles for configuration and updating of M2M units or devices in a network may be secure and cost efficient in terms of device management routines and principles.

Figure 1:
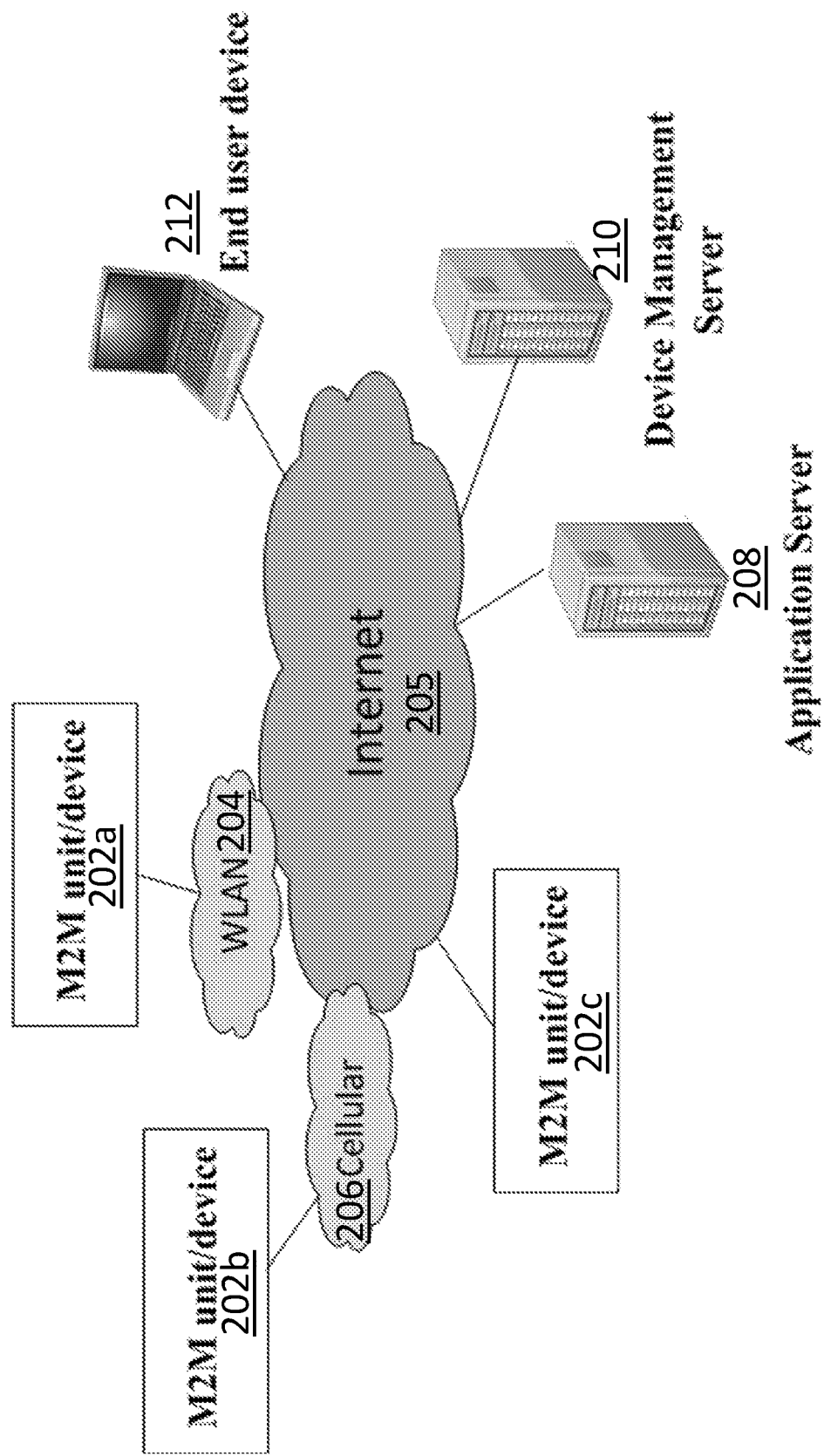
FIG. 1 illustrates an example of a M2M network.

FIG. 1 illustrates an example of a M2M network 200 that may include M2M units or devices 202a-c. According to an example, in the system or network 200, the M2M units or devices 202a-c may be networked and/or may be controlled and/or operated by back-end servers such as a device management server 208, an application server 210 or by an end-user device 212 such as smart phones, lap top computers or desktops. The M2M units or devices 202a-c themselves have all general Internet connectivity but the access network used may be of different types including, but not limited to, cellular access, WLAN access, fixed broadband access or corporate network access, and/or the like. For example, as shown in FIG. 1, a M2M device or unit 202a may be connected to a WLAN 204 through which it may connect to the internet 205, the M2M device or unit 202b may be connected to cellular network 206 (e.g., that may be one or more of the networks described in FIGS. 22A and 22C-E) through which it may connect to the internet 205, and the M2M device 202c may be directly connected to the internet 205.

In the example shown in FIG. 1, the M2M units or devices 202a-c may be connected to the Internet and, consequently, vulnerable to network based attacks. As such (e.g., to combat such attacks), the M2M units or devices may be authenticated and protected communications may be provided and/or allowed over the Internet. According to an example, the M2M units or device such as the M2M units or devices 202a-c may be provisioned with trusted communication security credentials such that one or more methods for setting up secure communication channels with external entities such as the Internet Key Exchange (IKE) and Internet Security Protocol (IPSEC) protocol suits and/or TLS and DTLS protocol suits. With a communication domain such as one for a single operator cellular network domain, credential provisioning for secure communication establishment may be based on Universal Integrated Circuit Card (UICC) credentials. However, in one or more typical M2M examples including one or more examples described herein, a single operator access or even cellular network access may not be assumed, but some M2M units may be have direct internet connection through other means such as fixed network access through Power over Ethernet (PoE) cables, local wireless access points over IEEE 802.15.4 networks like ZigBee, Bluetooth, through WLAN access, and/or the like. As such, UICC based authentication and secure network communication set-up may not a viable option as one or more of the M2M units or devices may not have a SIM card or embedded SIM. Additionally, in an example, a traditional way or manner of handling such an issue by using different identification and/or authentication methods for different units may not be cost efficient (e.g., as they may use the end applications to handle several different authentication options in parallel). Further, the number of different M2M units or devices for an application may be large and one or more of the M2M units or devices may be resource constraint devices with limited memory and computing power. This may imply that there may need to be cost efficient and light weight techniques to provision the M2M units or devices with the credential information needed to allow secure authentication and connection set-up with the M2M units or devices within a single application domain. The examples herein may be used with resource constrained devices and may be compatible with the Constrained Application Protocol (CoAP) that may be under development by the IETF Constrained RESTful Environments (core) working group.

The system and/or methods herein may address one or more of the problems associated with current M2M units or devices and/or systems. For example, the systems and/or methods herein may provide an a access network independent system for efficient and secure device provisioning of a large amount of heterogeneous M2M units belonging to different M2M application domains.

According to an example, a secure device life-cycle may be provided and/or managed (e.g., in M2M systems). For example, from a security architecture perspective, the devices or the device platforms may be an important part of an M2M security solution. To design such systems or architectures that may be used or work in real and practical use case scenarios or examples, a life-cycle management perspective for the devices or device platforms may be analyzed and/or used (e.g., may be taken into account).

Figure 2:
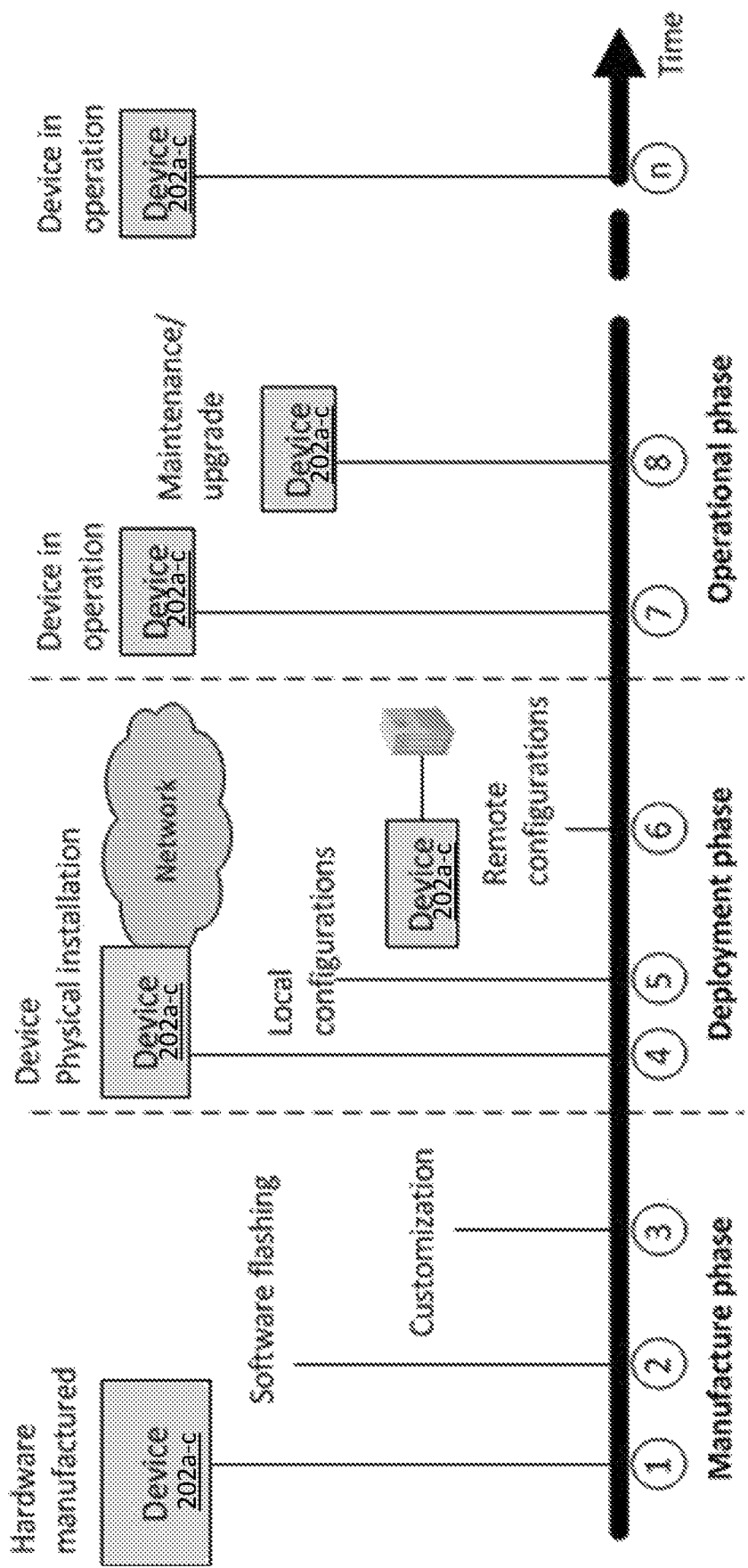
FIG. 2 illustrates an example of a device management life cycle.

FIG. 2 illustrates an example a device life cycle perspective that may illustrate (e.g., from a security perspective) functions or actions that may be typically part of a connected device's lifecycle. For example, 1-8 may be performed and a device (e.g., the M2M units or devices 202a-c) may continue to be in operation over time (e.g., as shown by n). In an example, 1-8 and/or n may illustrate (e.g., from a security perspective) one or more functions or actions that may be part of a connected device's lifecycle. As shown, the life of the device may start with a manufacture phase including the hardware manufactured at 1 and software and configuration customization at 2 and 3 for the device (e.g., 202a-c). The next phase may be the deployment phase in which the device (e.g., 202a-c) may be customized to be able to operate for the network it may reside in and based on or according to its end customer requirements. The configurations that may be performed at installation on the device (e.g., 202a-c) though physical presence at 4, locally at 5, and/or remotely at 6 from a management server may be distinguished. The device (e.g., 202a-c) may then be operation at 7 during the operational phase. The device may be taken out of service (e.g., out of operation at 7) with some regularity such that new software may be installed or for physical maintenance at 8. The device (e.g., 202a-c) may continue to be in operation and/or upgradeable over time (e.g., as shown by n). In this device life-cycle perspective, operation of the device (e.g., 202a-c) in the operation phase may be provided and/or guaranteed (e.g., if the right security and/or safety mechanisms may be available in the other phases such as the manufacture and/or deployment phase).

Figure 3:
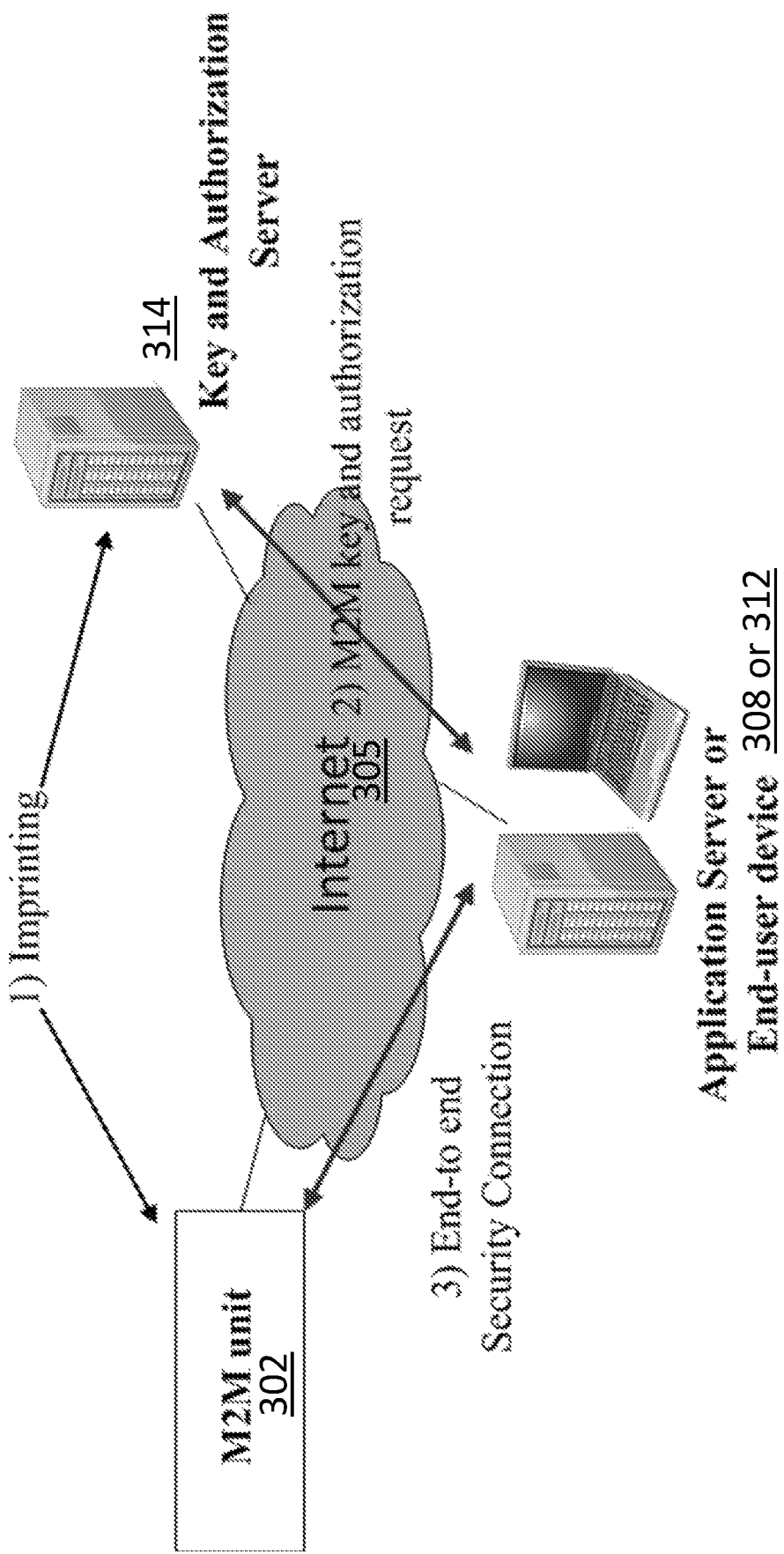
FIG. 3 illustrates an example of authentication and authorization of one or more devices in a M2M network.

In one or more examples herein, communications security and access control for resource constraint M2M units or devices may be provided and/or used. For example, authentication and authorization of resource constraint connected devices (e.g., such as those shown in FIGS. 1 and 2 including 202*a-c*) may be performed or provided where key management such as heavy key management and authorization decisions may be performed by a certain entity in the network. This example may be illustrated in FIG. 3. As shown, an advantage with this example may be that it may enable or allow offloading of computational demanding security processing of a M2M constraint device while still allowing end-to-end security between an end user device such as an end user device 312 (e.g., that may be the same or similar to the device 212) and/or an application server 308 (e.g., that may be the same or similar to the server 208) and M2M units such as a M2M unit or device 302 (e.g., that may be the same or similar to the units or devices 202*a-c*).

According to the model, the M2M unit 302 may be provisioned with an initial key material at device deployment and a trust relation (e.g., as shown by 1, for example, imprinting in FIG. 3) based on this key material may be established between the M2M unit 302 and the back-end system (e.g., 314 in FIG. 3), for example, at 1. may be used to set up secure connections between end-user devices such as the end user device 312 and/or application server 308 (e.g., at 3) and/or to make fine grain authorization decisions for services offered by the M2M units to remote units. For example, a trust relationship may be established by imprinting between the M2M unit or device 302 and key and authorization server 314 (e.g., the back-end system) at 1, a M2M key and authorization request may be provided and/or received (e.g., after the trust relationship) between the back end system such as the key and authorization server 314 and the application server 308 or end user device 312 at 2, and a secure connection may be established by the M2M unit 302 and the end user device 308 and application server 312 at 3. This model may be adopted by IETF and may be associated with Authentication and Authorization in Constrained Environments (ACE) in IETF.

For example, at 1, the key may be stored at the M2M unit or device 302 and in the authorization server (e.g., during imprinting or imprinted thereon). The M2M unit or device 302 and the authorization server 314 may share (e.g., after imprinting) a secret that in turn may be used to set-up secure connections between application servers such as 308 and/or end user devices such as 312 at 2. As such, in an example, the application servers or end user devices such as 308 and/or 312 may contact or communicate with the authorization server 314 that may (e.g., first) check and/or determine whether these devices may be authorized to connect to the M2M unit or device 302. If authorized, the authorization server 314 may issue credentials (e.g., based on the one it shares with the M2M unit) such that the application servers and/or end user devices (e.g., 308 and/or 312) may convince (e.g., using or supplying the credentials) the M2M unit or device 302 that they may be authorized to connect thereto and may use such credentials for establishing secure connections between the application server 314 and/or end user device 312 and the M2M unit or device 302 at 3.

In one example, an option such as a main option to protect CoAP applications and other constraint M2M units, end-to-end, may be a Datagram TLS DTLS protocol. The DTLS handshake protocol may assume that involved peers may have been previously provided with some security material. This may include a set of preinstalled keys that may be used during the DTLS handshake agreeing on a premaster secret. Such a premaster secret may be used with one or more random values that may be generated by a client and server to compute a master secret from which the security material may be generated. DTLS may provide different approaches such as two main approaches to provide preinstalled keys.

An example approach (e.g., a first approach) may assume that each DTLS node may retain an asymmetric key pair. During the handshake, a server (e.g., which may be the M2M unit 302 acting as a server in a DTLS connection) may provide its own public key to a client (e.g., which may be 308 or 312 acting as a DTLS client in a secure end to end connection) such that the latter may secretly send the premaster secret as part of the ClientKeyExchange message, which may be part of a DTLS secure set-up procedure or end to end security channel establishment in FIG. 3. In an example, this key provisioning policy may indicate or admit that key pairs may be provided either with or without an associated certificate. In the former case, the key pair may come together with an X.509 certificate that may bind it to its Authority Name and may be signed by some common trust root. In an example, DTLS nodes may retain a list of root trust anchors and associated public keys that can be used to validate certificates. In the latter example, also known as raw public key, key pairs may include or come with no certificate, and may be generated by manufacturers and installed on nodes before deployment. Then, a DTLS node may rely on out-of-band techniques to validate raw public keys received by other peers, and typically retains a list of identities of peers it may communicate with.

An additional or alternative approach (e.g., a second approach) may assume that each DTLS node may retain a list of symmetric pre-shared keys (PSKs). Each one of such keys may include a list of nodes it may be used to communicate with, and may be generally shared by multiple entities such as more than two entities. Practically, a DTLS client (e.g., 308 or 312) may share a symmetric key with a DTLS server (e.g., 302) it may want to communicate with. During the DTLS handshake, the client may indicate which particular symmetric key may be going to be used, specifying a PSK identity (ID) in the ClientKeyExchange message. To help the client to select which identity may be used, the server may optionally provide a PSK identity hint in the ServerKeyExchange message. Both the client and server may compute the premaster secret from the symmetric key they may have agreed upon.

For some constraint devices the PSK approach may be example that may be used and, on the other hand, the standard DTLS approach for PSK may not scale well for a large number of M2M nodes as described herein with respect to the proposed credential provisioning example.

Further, in examples, M2M security provisioning standards may be provided and/or used. For example, secure provisioning of mobiles and devices may be subject to standardization including one or more secure device credential provisioning standards described herein and/or SIM provisioning described herein.

In an example, M2M systems and/or devices or units may be subject to one M2M. For example, the M2M industry imitative may include working with creating improved interoperability among M2M vendors and service providers. So far a general requirements specification as well as a couple architecture analysis specification that may have been publicly released may be used.

The one M2M requirements may include that an M2M system be able to remotely and securely provision M2M security credentials in M2M devices and/or gateways. There may not be a specific method for this provisioning, but methods such as 3GPP Generic Bootstrapping Architecture (GBA), EAP-based methods, and/or the like may be used. EAP may be a flexible framework where a "suitable" authentication method may be used as "plug in" to the protocol. The 3GPP GBA framework may be used for bootstrapping security though the usage of the SIM credentials for a third party application. One M2M may be global standardization initiative that may be provided and/or used by ETSI.

According to an example, M2M systems and/or devices or units may be subject to ETSI (e.g., ETSI 102 690). The ETSI specification may define an M2M functional architecture for M2M services using an IP capable underlying network such as those defined by 3GPP, TISPAN and 3GPP2. Methods or procedures for bootstrapping, security, and management as well as charging may be provided.

The ETSI M2M architecture may provide or assume a security relation between the M2M device and/or gateway domain and the network domain where the services nodes may reside. This relation may be defined through a root key, a shared symmetric key between the M2M node and the M2M service provider, and/or the like. The root key may be used for subsequent authentication with the M2M service provider and, on the network side it may be managed by a specific key server such as, for example, a M2M Authentication Server (MAS). The provisioning may be performed or done by the boot strap server or, for example, in the ETSI standard, the M2M Service Bootstrap Function (MSBF).

There may be three different ways or techniques for provisioning this key (e.g., the key that may be imprinted or stored in an example i.e., an empty M2M unit or device may be imprinted with a key and/or may be bootstrapped where a key may or may not be already available or installed (e.g., the M2M unit or device may not be empty) as described herein) into a device including, one or more of the following. For example, the root key may be provisioned to the device as manufacture or at deployment. In this example, it may be the responsibility of the M2M service provider to make sure that the procedure may be secure and reliable. Additionally, in an example, the root key may be derived from network credentials such as SIM credentials (e.g., where the specification described herein may include tech and/or principles for how this may be done or performed). Further, according to an example, the root may be provisioned in an access independent method, for example, in case the M2M service provider and the network operator may not share a common trust relation.

Figure 4:
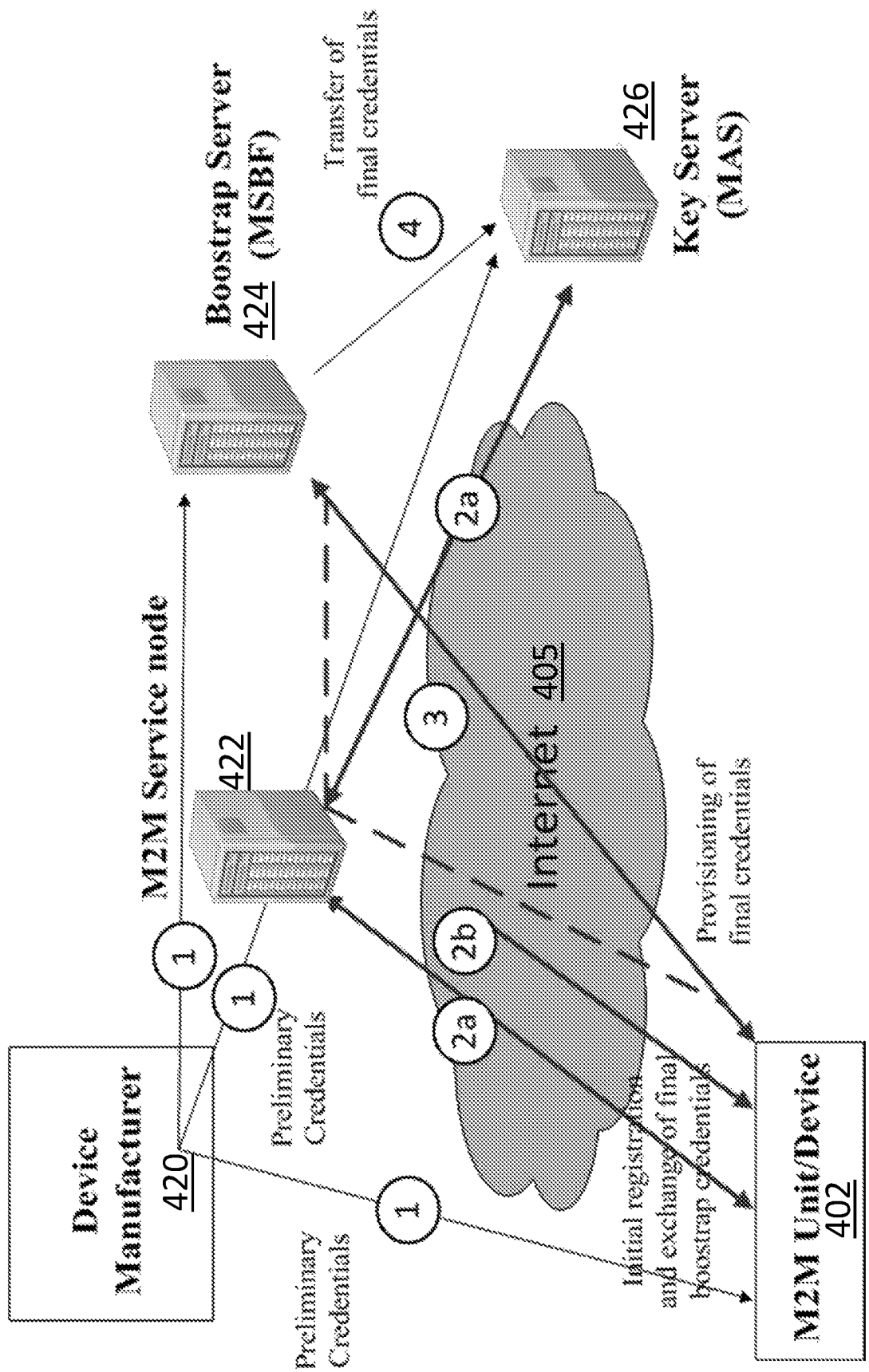
FIG. 4 illustrates an example of M2M credential provisioning in a M2M network.

FIG. 4 illustrates an example of an access independent method (e.g., in ETSI) that may be used. Other specific methods may be used (e.g., that may be divided into one or more sub-methods). According to an example, each of the methods may share a basic procedure for root key bootstrapping.

As shown, at 1 in FIG. 4, a M2M unit or device such as M2M unit or device 402 (e.g., that may be the same or similar to the units or devices 202a-c or 302) may be pre-provisioned with a temporary credential, public key or (symmetric key) based. In the symmetric key example, the same temporary credentials may be also given to a M2M bootstrap (MSBF) such as bootstrap server (MSBF) 424 and/or authentication function (MAS) such as key server (MAS) 426 in the M2M network domain (e.g., via an M2M service node such as M2M service node 422). In the public key example, the MSBF and the M2M unit or device may share common trusted certificate authority (CA) or other means or techniques to verify certified public keys.

The preliminary credentials may be used to give the M2M node temporary connection to the M2M service provider that then may bootstrap the unit with further preliminary credentials that may be used for the actual device root key provisioning (e.g., at 2a-2b). This may be optional. For example, at 2a, an ordinary mutual authentication with the M2M service node maybe performed using the preliminary credentials (e.g., in form of a preliminary root key) shared between the M2M unit/device and the MAS. At 2b, using the mutual authenticated and protected channel established at 2a, the M2M node may bootstrap the M2M unit/device with additional security bootstrapping material such as private public key pairs and the trusted public key of the MSBF.

At 3, using the pre-provisioned parameters (e.g., that may be obtained either directly in 1 or through 2 such as 2a-2b) the M2M unit/device and the MSBF make a protected key exchange and derive/deliver or shared root key and permanent device ID. This may take place through direct communication between the M2M unit/device and the MSBF or indirectly through the M2M service node.

At 4, the device ID and the key agreed on at 3 may be securely transferred from the MSBF to the MAS. This may be performed using any suitable method or technique.

Additionally, in one or more examples herein, Open Mobile Alliance (OMA) Device Management (DM) may be provided and/or used. According to an example, the OMA standard may include a specification of device secure bootstrapping procedures. The OMA bootstrap information may include the device credentials that may be used to set up a secure session between an OMA client and an OMA Device Management (DM) server. Different bootstrap methods may be used in OMA including, for example, one or more of the following: factory bootstrap, smartcard bootstrap, client initiated bootstrap, or server initiated bootstrap.

The factory bootstrap may imply and/or may provide that credential information may be configured in the device at manufacture. In the smartcard bootstrap, the bootstrap information may be sent in a secure channel from the smart card directly to the client device. With client initiated and/or server initiated bootstrap, the bootstrap communication may be sent over the network to the OMA client. The protection method the standard may provide may use the 3GPP GBA framework for protecting the bootstrap communication channel. The OMA bootstrap information may allow or enable the OMA client to securely connect to a provisioning server over a secure channel such as TLS. The provisioning server may configure the client with the final credentials used to set up management sessions with the device.

Figure 5:
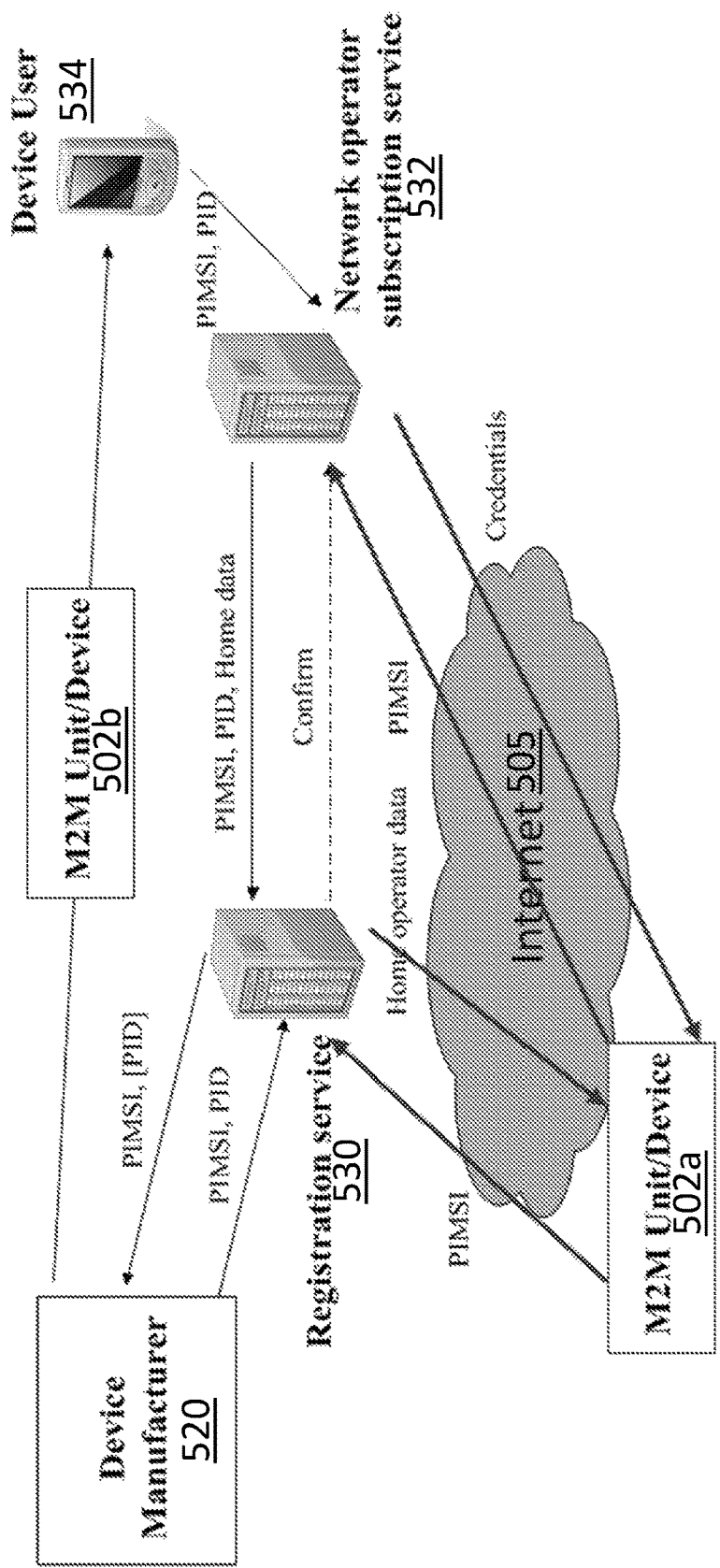
FIG. 5 illustrates an example of SIM credential provisioning in a M2M network.

SIM remote provisioning may be provided and/or used. For example, relaxing the hardware based SIM provisioning system and moving to a "soft" base SIM provision model or "downloadable SIM" model for M2M units may be discussed and/or described. Examples of a soft provisioning example or paradigm may be shown in FIG. 5. In such examples, a wireless downloadable USIM credential provisioning system for M2M units may be provided as shown in FIG. 5. For example, a device manufacture may be used 520, a registration service 530, a device user 534 (e.g., that may be the same or similar to the end user device 212), and/or a network operator subscription service 532 may be used for provisioning M2M units or devices 502a, 502b (e.g., that may be the same or similar to the units or devices 202a-c, 302, and/or 402).

These approaches may be based on the principle of using preliminary access credentials to get temporary network access and then later replace this credential with permanent SIM credentials. A problem with these solutions or examples may be that the security of the solutions described in the examples above being built upon the assumption of utilizing the cellular access security mechanisms or that they may not provide a strong security model for the actual device credential provisioning. The system and/or methods described herein may address such problems. For example, the systems and/or methods described herein may work with any suitable network access method and may provide strong end-to-end security for connections that may be used in the device provisioning using the credentials given at device provisioning.

In the standardization direction for a cellular M2M unit, SIM provisioning may use a flexible SIM provisioning model and/or a special purpose so-called "embedded SIM" hardware module (e.g., that may be different from the original downloadable SIM main assumption). The GSMA specification may include a complete embedded SIM provisioning architecture where a specific entity such as a "Subscription Manger Secure Routing" entity may be the entity responsible for the actual SIM provisioning. The main device architecture may be based on the Global Platform concept of Security Domains for managing multiple credentials on a single embedded SIM. The architecture and security model may be complex and may be compatible with UICC base credentials. This may imply, in an example, that the model may not be suitable for non-SIM M2M units.

As described herein, systems and/or methods may provide an access network independent system for efficient and secure device provisioning of a larger amount of heterogeneous M2M units that may belong to different M2M application domains.

According to examples herein, an M2M application provider may be a different entity a manufacturer of the M2M units or devices. As such, a M2M unit provisional system that may rely on final device credential provisioning in factory may not be used in one example. An alternative may include using a SIM-based or an embedded SIM based provisioning system. Unfortunately, as described herein, such a system may work for M2M units with SIM or embedded SIM-cards and may not be a generic solution or example for an M2M application domain with heterogeneous network access. As such, systems and/or methods herein may include using a credential provisioning model similar to examples described herein for downloadable SIM, but compatible with security protocols such as IKE/IPESEC or TLS/DTLS.

Figure 6:
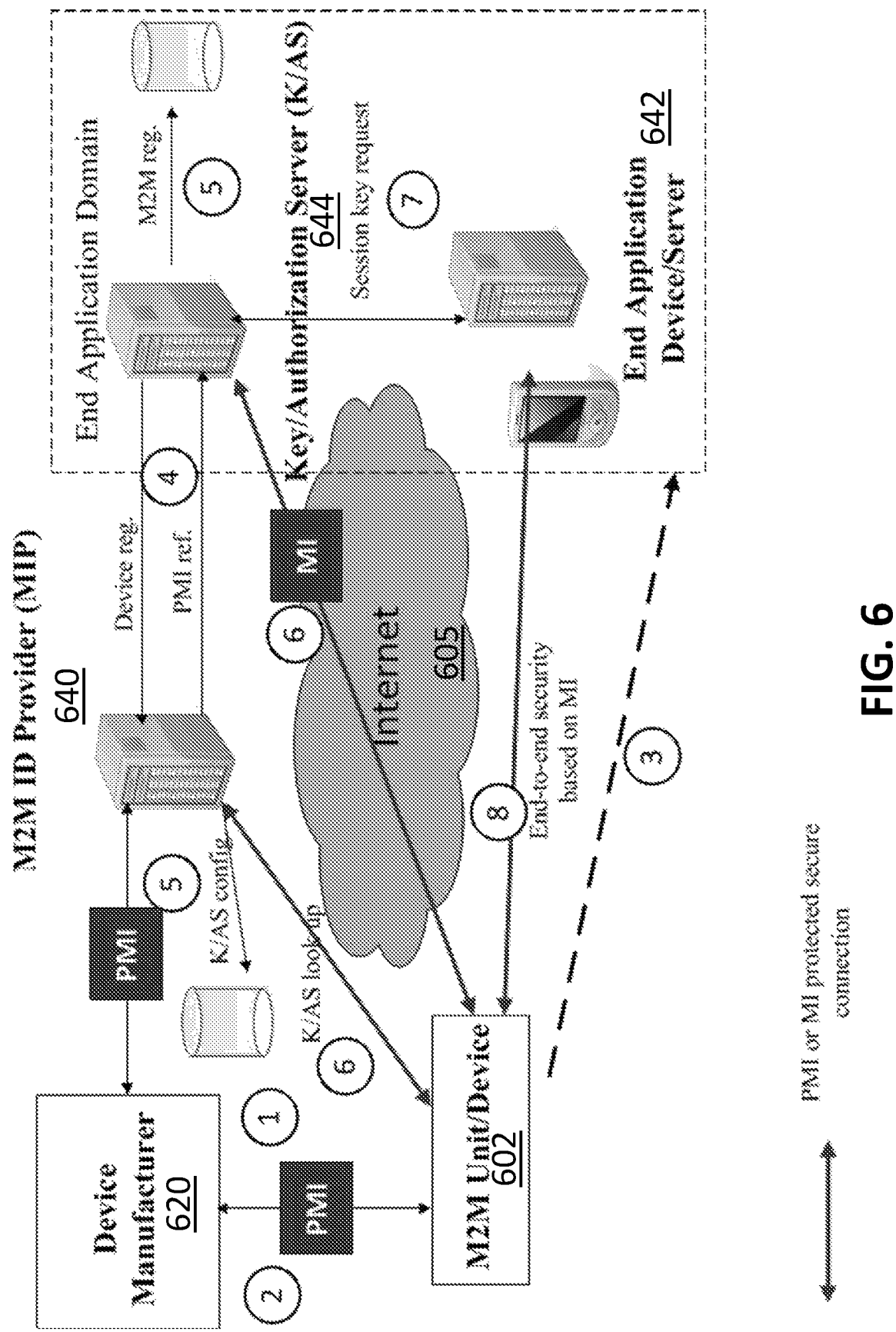
FIG. 6 illustrates an example of credential provisioning in a M2M network for one or more of the examples described herein.

FIG. 6 illustrates an example of a credential provisioning system and method that may include a downloadable SIM and may be compatible with security protocols such as IKE/IPESEC or TLS/DTLS as described herein. In examples, one or more devices (e.g., the M2M unit or device, and/or the like as described herein) may be configured to perform at least part of the method of FIG. 6. For example, an access technology independent credential provisioning service may be offered to M2M application users. This service may be or may include a M2M ID Provider (MIP) such as a MIP 640 (e.g., that may provide a M2M ID (MI)) as shown in FIG. 6. According to an example, an M2M unit such as M2M unit or device 602 (e.g., that may be the same or similar to the units or devices 202a-c, 302, 402, and/or 502) may be equipped with one or more software based preliminary credentials in, for example, as part of a soft ID module that may be a Preliminary M2M ID (PMI) module and may be shown at 1-2. For example, as shown, the PMI module may be installed and/or provided on the M2M unit or device 602 by a device manufacturer 620 during manufacturing and/or provisioning of the device thereby. In an example, the PMI module may include preliminary credentials. The preliminary credentials may be used to authenticate the M2M unit or device 602 and/or establish secure communication channels, for example, to provision or provide a more permanity credential such as a MI as described herein.

An M2M application provider such as an end application device and/or server 642 may receive a unique reference to the PMI of the M2M unit or device 602 and may register the unit at the MIP, for example, using a K/AS (e.g., K/AS 644) that may be an application key and authorization server. In an example, this may be performed at M2M unit acquisition and may be shown at 3-5. For example, an owner of the M2M unit or device 602 may receive the PMI (e.g., when acquired and/or via access of the unit by a third party) as an electronic file and/or by reading the PMI from the M2M unit or device 602 at 3 and may register such information (e.g., via the device with the MIP as shown at 4 and 5.

The M2M application provider (e.g., 642) may use the service provided by the MIP (e.g., 640) to replace the PMI (e.g., within the M2M application provider domain) with a permanent M2M credential module such as a M2M ID (MI). This may be protected end-to-end using the pre-shared-key or public key based credentials (e.g., which may be described in more detail below) in the PMI. This may be performed at the device deployment, according to an example, and may be shown at 6. For example, at 6, the PMI module in the M2M unit or device 602 may be replaced with the MI.

In an example, the MI may be used by the M2M application provider (e.g., 642) to set up secure mutually authenticated communication channels with the M2M units (e.g., 602) within the applications domain and/or for secure authorization at service access requests to the M2M units (e.g., which may be shown at 7-8). For example, the end application device or server 642 may send a session key request for the MI (e.g., that may be registered and/or provided at 6) to the K/AS 644. The K/AS 644 may return (e.g., send) an identifier and/or indication associated with the MI to the end application device or server 642 and may be received thereby. The M2M unit or device 602 and end application server 642 may establish the communication channels by authenticating each other with the MI as described herein. For example, the end application device or server 642 may compare an identifier or indication associated with the MI in the M2M unit or device 602 with the identifier or indication received at 7 in response to the session key request and if such information may match may establish the communication channel at 8.

Figure 7:
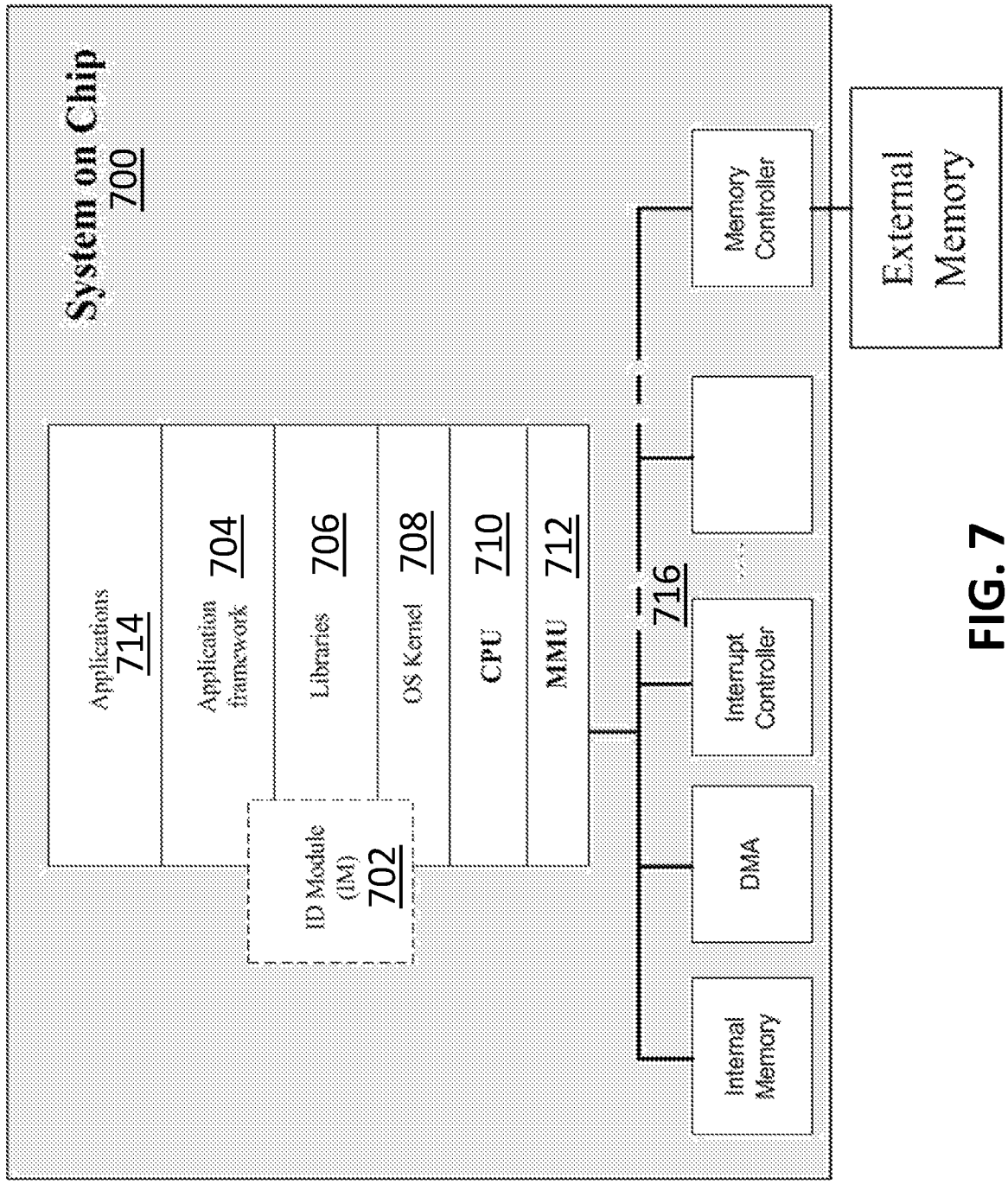
FIG. 7 illustrates an example of a secure or protected M2M device or unit for one or more of the examples described herein.

The examples herein (e.g., such as the system and/or method in FIG. 6) may be based on use of a software module that may hold or include the M2M unit credential information such as the M2M ID (MI) and secret/public keys used for the set-up of secure connections with the M2M unit and/or for making authorization decisions. As such, in an example, such software module may be protected from attacks trying to read out secret information or modifying the ID information. This may be performed or done by running the M2M software module in a protected execution environment. An example of a protected M2M unit may be shown in FIG. 7. In an example, as shown in FIG. 7, the M2M unit or device 602 may include a system on chip 700. The system on chip 700 may include an ID module (IM) 702 that may be used to store the information (e.g., the identifier and/or keys, and/or the like as described herein) associated with the MI and/or PMI. As shown, the IM 702 may be part of an application framework 704, one or more libraries 706, and/or an operating system (OS) kernel 708 that may be part of the system on chip 700 of the M2M unit or device 602. These may be above, for example, in a stack, a processor or CPU 710 and/or an MMU 712 (e.g., that may access device resources such as memory, DMA, controllers, and/or the like) of the system on chip 700 and/or below, for example, in the stack, one or more applications 714 on the M2M unit or device 602. Additionally, other secure execution environment implementation options may be used in examples herein and may be described in more detail below.

According to the examples herein, a PMI can be kept after the installation of the IM or replaced by long term credential such as the MI in the IM depending on the end application user requirements. Thus, in examples, the IM may hold the PMI that may be replaced by the MI and/or the PMI and the MI. If the PMI may be kept, it may be used to later reset the M2M unit into its original factory setting by a separate reset command from a current owner. This may enable or allow an ownership transfer of the M2M unit and a possibility to register the M2M unit by a new user or owner domain based on the PMI credentials.

The examples herein (e.g., the system and/or methods herein) may provide one or more advantages. For example, the systems and/or methods may enable or allow application and access technology independent M2M unit credential provisioning (e.g., in factory). As such, the example systems and/or methods herein may decouple the access independent provision functions from the access dependent provision functions. This may be useful or attractive when a single application domain may manage several different M2M units with one or more different access requirements. Further, in an example, the network dependent credential provision may be performed or done for the different access technologies. For SIM based units, this provisioning may be performed or done using, for example, the standard proposed examples that maybe specified by GSMA and the systems and/or methods herein may be independent and compatible with such provisioning.

The systems and/or methods herein may provide a high level of security at the same time as it may enable or provide decoupling of device credential and M2M manufacturing. In particular, according to an example, this may enable or allow M2M software configuration/flashing at factory without defining the end use of the device. In an example, the final credential provision may be performed or done at device deployment phase. This may be beneficial or attractive as that may be the time where other application dependent configurations/flashing typically may be performed or done. To have cost efficient configurations at deployment, direct manual configurations of the M2M unit may be avoided. As such, configurations may be performed or done remotely in an example. Remote configurations may be sensitive to network based attacks and may be protected. The systems and/or methods herein may give such a protection using the preliminary credentials that may be already installed in factory.

Furthermore, the final credential provisioning may be performed or done away from the M2M application domain (e.g., which may imply that after the initial registration, the PIM may not be able to influence the security of the system or compromise M2M units).

The credential model in the systems and/or methods herein may enable or allow running M2M preliminary soft credentials provisioning as a separate business and/or service to M2M application providers without assuming a particular access technology for the M2M unit (e.g., except for global Internet access in an example). In examples, the systems and/or methods herein may work with constraint devices and may be compatible with the IETF core working group communication model as well as the IETF ACE working group preliminary security architecture.

Similar to the example systems and/or methods herein, ETSI may provide a framework for secure bootstrapping of device credentials using preliminary credentials provided at the factory phase. However, a drawback with ETSI may be that it may use (e.g., require) a complete trust relation between the bootstrapping function (MSBF) in the network and the entity in the network responsible for handling the device credentials such as the MAS in the ETSI example and the K/AS in the systems and/or methods (e.g., the model) herein. In an example, according to the standard, the credentials may be directly delivered from the MSBF to the MAS (e.g., when the final credentials may have been derived between the M2M unit and the MSBF). Opposite of such an example, in the system and/or methods herein, the bootstrapping server such as the MIP may be used as initial trusted server for bootstrapping the M2M unit or device and then may not need to be trusted or have further relation with the entity actually managing the device or units once they may be deployed. This example may enable or allow running the device registration and/or bootstrapping as a separate business and/or service where the M2M application owner registers his or her M2M unit or device for first time bootstrapping and with preliminary credentials. These may be later exchanged with the real credentials that may be maintained by the end system application using a secure end-to-end protected final provisioning method as described herein.

Furthermore, according to examples, the systems and/or methods herein may be based on the same or similar authentication and protected communication method that may be used for connections and authentication functions described herein. This may simplify the implementation on the device side and may be more suitable for resource constraint M2M units or devices.

The OMA DM framework may be similar to the systems and/or methods described herein in the sense that credentials may be provided through a secure bootstrap procedure. However, the systems and/or methods herein may provide a particular approach (e.g., a three function or action approach) where first initial credentials may be configured into the device. Next, these credentials may be used at device deployment to connect to a specific initial provisioning server that may direct the device to the final end user domain where the final device credentials may be given. An advantage with such an approach compared to the OMA DM framework may be that this may enable or allow a device at factory to be given initial general security parameters that may be used and/or provided at deployment (e.g., and may be replaced as described herein) and, for example, when the end-user has registered the device, may be exchanged with the final permanent credentials. This may be a flexible model (e.g., system and/or method) that may enable or allow running credentials provisioning as a specific service and/or business for a broad range of devices independent of the end application domain.

In an example, the systems and/or methods for provisioning herein may be based on use of a symmetric key for the software based credentials modules (e.g., may be pre-shared key (PSK) based). This may be an example that may be used herein as such a solution may work with resource constraint M2M units or devices with limited computations capabilities.

This example may include (e.g., an assumption of) using a DTLS protocol to securely identify M2M units or devices and provide secure communication. The same principle may be used using the TLS or the IKE/IPSEC protocols or any other secure identification and/or communication principle.

According to an example, the MIP and/or the manufacturer may be responsible for providing M2M units with a PIM. The material that may be used for the PIM may be generated using one or more master keys. The same or similar master key may be used for key generation to a large number of different M2M units, which may simplify the credential provisioning. An example MIP master key may include KMIP or $K_{MIP}$ and IDKMIP or $ID_{KMIP}$ may be a unique identifier for this key.

In an example, a secure key server or authorization server (e.g., K/AS) may handle the device configuration at the M2M application domain. A K/AS may provide or manage keys such as two different keys for each M2M that may be registered at the K/AS. For example, the K/AS may manage a permanent master key (e.g., a KSM2M or $KS_{M2M}$) that used to renew device master keys and/or a master key (e.g., a KM2M or $K_{M2M}$) that may be used to generate session keys for securing end application communication between the M2M unit and the end application domain. As such, in examples herein, the $K_{M2M}$ may be master key that may be provided from the K/AS to the M2M to set up secure sessions with a M2M unit that (e.g., shared between K/AS and the M2M unit) and/or the $KS_{M2M}$ may be permanent unit master key that may be provided from the K/AS to M2M unit to generate new KM2M keys (e.g., shared between K/AS and the M2M unit)

Figure 8:
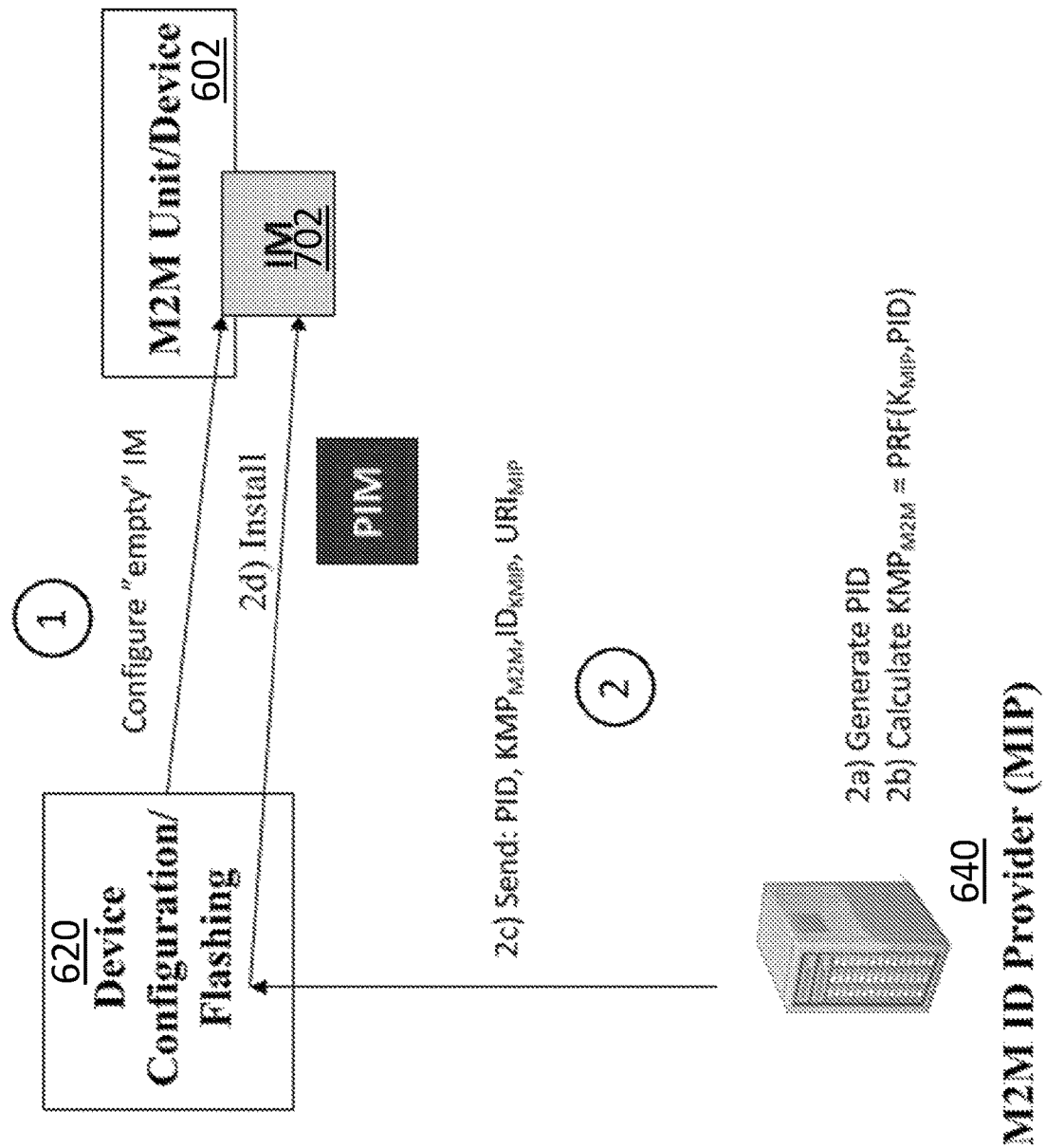
FIG. 8 illustrates an example of a manufacture phase configuration for PSK that may be used in one or more examples described herein.

An example system and/or method of credential provisioning (e.g., that may us a pre-shared key (PSK)) may be provided as described herein (e.g., below) and shown in FIGS. 8-11 (and/or generally in FIG. 6). In examples, one or more devices (e.g., the M2M unit or device, and/or the like as described herein) may be configured to perform at least part of the method of FIGS. 8-11. For example, as shown in FIG. 8, at 1, a M2M unit (e.g., 602) may be at manufacture (e.g., with a device manufacturer such as 620) and may be configured with basic software or applications such as firmware, operating system and generic applications. The M2M unit may be provided with an "empty" Identity Module (IM) (e.g., 702) that may be a software module running in a protected execution environment on the device as described herein. According to an example, an empty instance of this module may be configured at 1 or in an alternative or additional example, at 1 in combination with 2 yielding or generating a fully configured module directly to provide, for example, the PIM on the IM.

The module (e.g., IM 702) may provide one or more of following functions (e.g., according to one example when an interface may be based on a PKCS #11 standard). The module may provide secure, (e.g., confidentiality and integrity protected) persistent storing of one or more the following parameters: a permanent master key, a master key, a unique identifier for the master key trust anchor for the IM such as the MIP or K/AS, a unique identifier, ID, of the M2M unit, a manufacture device key for the M2M unit, a uniform resource identifier (URI) (or other network address) of the MIP or K/AS for the IM (e.g., depending on if it is a PIM or final IM). The module may further provide an API towards other software modules running on the M2M unit offering through this interface operations on the parameters described herein (e.g., above).

At 2, the IM or module may be modified, for example, with the PIM. There may be different examples for such a modification or customization (e.g., as shown in 2a and 2b). For example, at 2a (e.g., as part of the final M2M unit SW customization), the "empty" IM at 1 may be customized with a preliminary key material such as the parameters described above in 1. At 2 an, in particular, 2a the "empty" IM may be transformed into a fully functional PIM. For example, at 2a, the MIP may use a random function to generate a unique and sufficiently long random value (e.g., long enough to provide entropy for high level randomness and/or security) that may serve as a Preliminary Identity (PID) for the M2M unit. The MIP may use a suitable secure Pseudo Random Function (PRF) such as a HMAC function with SHA-2, $K_{MIP}$ and PID and may calculate a preliminary master key, $KMP_{M2M}$, for the M2M unit as $KMP_{M2M}=PRF(K_{MIP}, PID)$. The $KMP_{M2M}$ may be a preliminary master key for a M2M unit that may be shared between the MIP and the M2M unit. According to an example, the $K_{MIP}$ may be a M2M ID provider generic master key (e.g., that may be provided therefrom).

Further (e.g., at 2a), the PID, a $IDK_{MIP}$ (e.g., an identifier for $K_{MIP}$) and the $KMP_{M2M}$ as well as a network identifier such as $URI_{MIP}$ of the MIP may be securely transferred (e.g., confidentiality and integrity protected) using a suitable secure channel, to the manufacturer from the MIP. In an example, the parameters may be transferred or sent in a batch (e.g., to several potential new M2M units at the same time). The manufacturer may use a PRF to calculate a sufficient long manufacturer device key for the unit, $MK_{M2M}$. The $MK_{M2M}$ may be a manufacturer device key for an M2M unit that may be provided from the manufacturer to the entity that may acquire the M2M unit.

The manufacturer (e.g., at 2a) may securely configure the M2M PIM as follows with reference to the IM description or parameters described herein (e.g., at 1). For example, the manufacturer may configure the permanent master key, which may be may be kept as empty, the $KMP_{M2M}$, the $IDK_{MIP}$, the PID, the $MK_{M2M}$, and/or the $URI_{MIP}$.

According to an example, at 2b (e.g., in an alternative or additional example), as part of the final M2M unit SW customization, the "empty" IM explained at 1 may be customized with preliminary key material such as the parameters described at 1. During this process, the "empty" IM may be transformed to a functional PIM (e.g., a fully functional PIM) as follows. The MIP securely (e.g., over a protected channel) may provide the device manufacturer a batch master key $KMP_{M2M}$ valid for security configuration of a batch of n different M2M units. The MIP may further provide an ID value for the master key $IDK_{MIP}$.

According to an example, the MIP may provide the device manufacturer a Pseudo Random Function (PRF) to be used to calculate factory master keys for the devices as described herein. For example, the manufacturer may use a good random function to generate a unique and sufficient long random value that serve as a Preliminary Identity (PID) for the M2M unit. The manufacture may further use the PRF to a calculate a preliminary master key, $KMP_{M2M}$, for the M2M unit as $KMP_{M2M}=PRF(KMP_{M2M}, PID)$. The manufacturer may use a suitable PRF to calculate a sufficient long manufacturer device key for the unit, that may be a $MK_{M2M}$.

In an example (e.g., at 2b), the manufacturer may securely configure the M2M PIM as follows with reference to the IM description at 1 (e.g., with the parameters thereof). For example, the manufacturer may configure the permanent master key, which may be kept as empty, the $KMP_{M2M}$, the $IDK_{MIP}$, the PID, the $MK_{M2M}$, and/or the $URI_{MIP}$.

Figure 9:
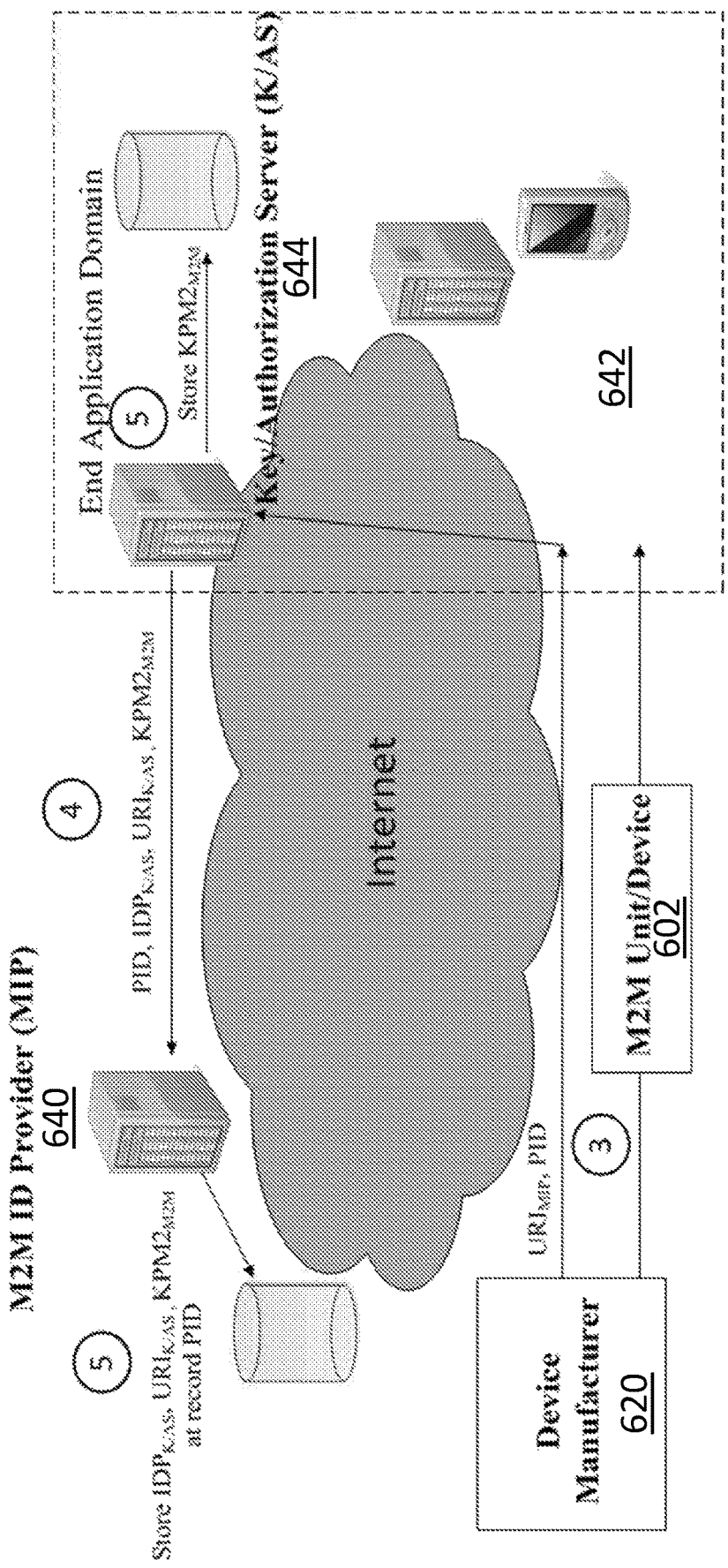
FIG. 9 illustrates an example of a device acquisition phase configuration for PSK that may be used in one or more examples described herein.

As shown in FIG. 9, at 3, the M2M unit (e.g., 602) may be provided to an owner such as a M2M application owner (e.g., via an end application server or device 642). In an example (e.g., when the M2M unit may be acquired by the M2M application owner), the PID and $MK_{M2M}$ of the M2M unit may be included or provided (e.g., as part of the unit) and/or received from the manufacturer by the M2M application owner (e.g., via 642). A reference such as a URI and/or the like to the MIP responsible for the preliminary M2M unit credential registration may also be provided or included and/or received thereby (e.g., via 642). The M2M application unit (e.g., 642) may further include or receive (e.g., at 3) an electronic certificate that may certify that the application owner really may be the true owner of the acquired M2M unit.

At 4, the K/AS (e.g., 644) may connect or communication with the MIP over an interface such as a secure channel. For example, the M2M application owner (e.g., via the device or server 642 and K/AS 644) that may be operating the M2M unit (e.g., 602) may contact the MIP (e.g., 640) over a secure channel to establish communication between the M2M unit and MIP. The PID may be sent to the MIP (e.g., via the channel or interface that may be established) by the device or server 642 and K/AS 644. According to an example, as shown at 4, the certificate may be sent to the MIP and/or the K/AS to prove that the M2M application owner may be an actual owner of the subject M2M unit. The K/AS may transfer to the MIP at least one or more of the following information: the network identifier such as a $URI_{K/AS}$ address of the application owner key and/or authorization server K/AS, a K/AS preliminary key identifier ($IDP_{K/AS}$), a second preliminary randomly selected master key such as a $KMP2_{M2M}$ for the M2M unit that may be generated by the K/AS using a secure key generation process, and/or the like. As such, in an example, the $KMP2_{M2M}$ may be another or second preliminary randomly selected master key that may be shared between K/AS and MIP and given to the M2M unit by the MIP.

According to an example, at 5, the MIP (e.g., 640) may store the information (e.g., described in 4) together with the record of the M2M with PID. For example, the MIP may store one or more of the following: the network identifier such as $URI_{K/AS}$ address of the application owner key and/or authorization server K/AS, a K/AS preliminary key identifier $IDP_{K/AS}$, a second preliminary randomly selected master key such as a $KMP2_{M2M}$ for the M2M unit that may be generated by the K/AS using a secure key generation process, and/or the like together with the record of the M2M with PID. In an example, at 5, the K/AS (e.g., 644) may store $KMP_{M2M}$ at the PID M2M record.

Figure 10:
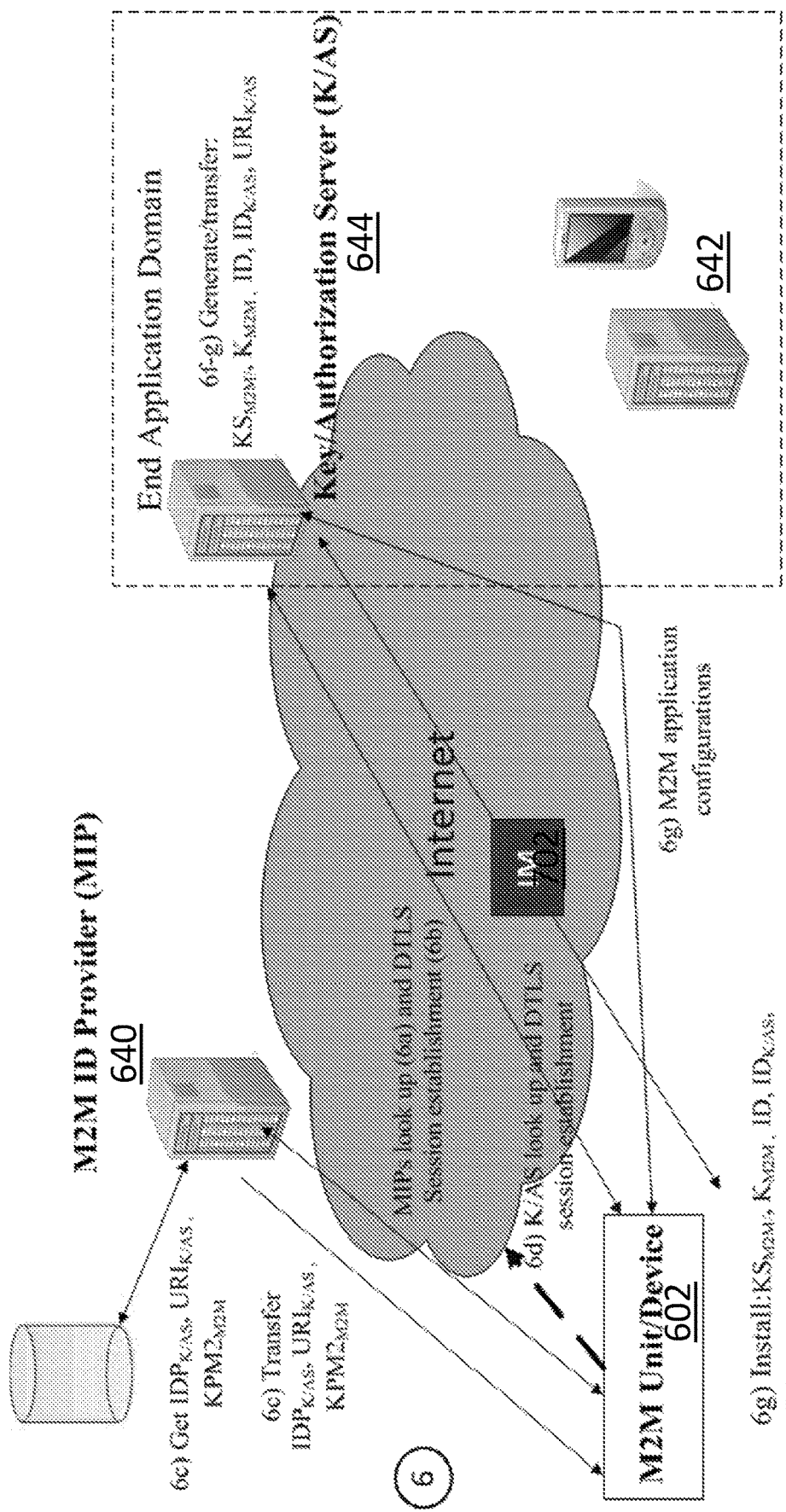
FIG. 10 illustrates an example of a device deployment phase configuration for PSK that may be used in one or more examples described herein.

As shown in FIG. 10, at 6, one or more of the following may be performed. For example, at M2M first time device deployment (e.g., directly after the M2M unit may have or get full Internet access (e.g., for the first time)), the following may be performed or take place. In an example, the M2M unit (e.g., 602) may use the URI of MIP to contact the MIP (e.g., 640) it may belong to or be associated with (e.g., at 6a). Further, according to an example (e.g., using the $IDK_{MIP}$, PID, and $KMP_{M2M}$), the M2M unit and the MIP may establish (e.g., at 6b) a secure PSK-based DTLS connection, for example, using PID combined with $IDK_{MIP}$ as key identifier. The MIP may determine (e.g., look up at 6c) the record of the connected M2M unit and may transfer the information such as the network identifier such as a $URI_{K/AS}$ address of the application owner key and/or authorization server K/AS, a K/AS preliminary key identifier $IDP_{K/AS}$, a second preliminary randomly selected master key such as a $KMP2_{M2M}$ for the M2M unit that may be generated by the K/AS using a secure key generation process, and/or the like (e.g., described at 4).

The M2M unit (e.g., 602) may use (e.g., at 6d) the information received from the transfer from the MIP (e.g., together with factory configurations) to generate create a new (or replace the old) IM (e.g., 702). According to an example, the IM may include the permanent master key, which may be kept as empty, the $KMP2_{M2M}$, the $IDP_{K/AS}$, the PID, the $MK_{M2M}$, the $URI_{K/AS}$, and/or the like. The M2M unit may use (e.g., at 6e) the information configured in the IM (e.g., at 6c) to determine or look up the K/AS and establish a secure PSK-based DTLS connection with the K/AS using the combination of PID and $IDP_{K/AS}$ as a key identifier and $MK_{M2M}\|MP2_{M2M}$ as a PSK key (i.e., the manufacturer key together with the $MP2_{M2M}$. According to an example, there may be different options of how these keys may be combined including a pure concatenation of the two keys, an XOR of the two keys, and/or the like. The IP address such as IPv6 or IPv4 of the M2M units may be recorded or received by the K/AS and stored together with the M2M ID and the rest of the M2M information in a suitable database or storage component (e.g., at 6f). In an example, the K/AS may generate (e.g., at 6g) one or more of the following parameter: a $KS_{M2M}$, a $K_{M2M}$, an ID such as a unique ID for the M2M unit, and/or the like. The K/AS may pre-generate these values in one example.

The key material, and/or the like that may be used to fully customize a new IM may be securely (over the protected DTLS connection) transferred (e.g., at 6h) from the K/AS to the M2M unit including, for example, the $KS_{M2M}$, the $K_{M2M}$, the $ID_{K/AS}$ (e.g., the permanent K/AS key identifier), the ID, kept empty or an indication thereof, $URI_{K/AS}$, and/or the like. The M2M unit may be configured for the particular M2M application domain with application specific configuration information and software (SW) (e.g., at 6i). According to an example, this information may be transferred and protected under the established DTLS connection.

Figure 11:
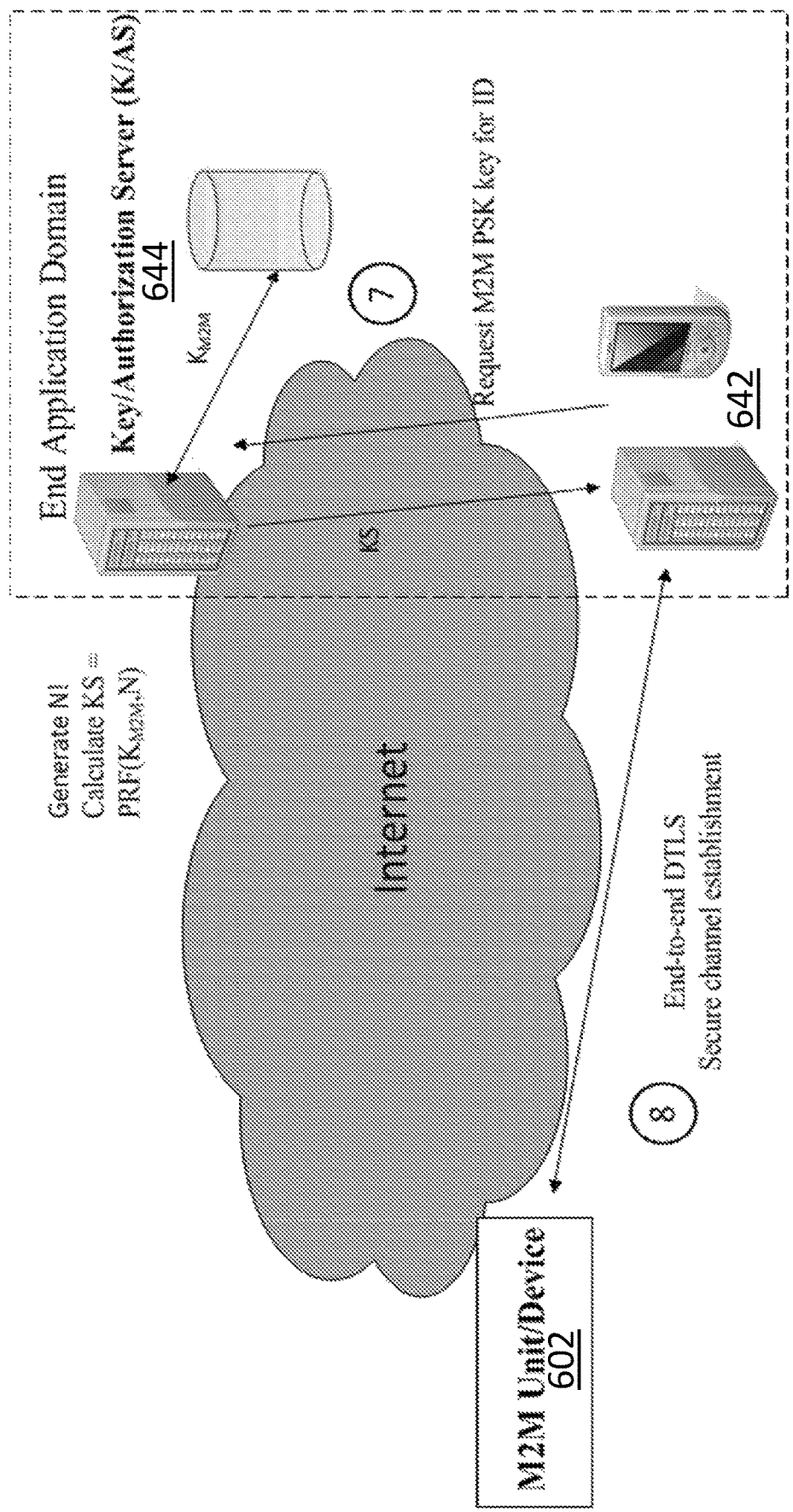
FIG. 11 illustrates an example of a M2M secure channel set-up for PSK that may be used in one or more examples described herein.

As shown in FIG. 11, at 7 (e.g., when the end user application server or user device may want to communicate with a certain M2M unit), the end user application or user device (e.g., 642) may determine or looks up its address and ID and may contact the K/AS (e.g., 644). According to examples, the K/AS and the application server or user device may be combined and may be the same physical unit and/or, as described herein, may be separate entities. Additionally, in an example, the K/AS may function as a M2M unit discovery server that used to find a certain service or particular M2M unit. At 7, the K/AS may find or determine (e.g., match) the record for the requested M2M unit and may obtain or receive $K_{M2M}$, may generate a sufficient large random nonce, N and/or may use this nonce to calculate a DTLS pre-shared session key, $KS=PRF(K_{M2M},N)$ and may transfer N and KS to the end user application server or user device. In one example (e.g., optionally), the end user application or user device may receive or get an authorization token based on $K_{M2M}$ from the K/AS that may be used to get access to particular services provided by the M2M unit (e.g., 602) and/or to authenticate the M2M unit.

In an example, at 8, the end user application server or user device (e.g., 642) may contact the M2M unit or device (e.g., 602) and may set up a secure DTLS connection with the M2M unit with mutual authentication. The DTLS connection may be established using the combined values ID, $ID_{K/AS}$, N as key identifier in the DTSL PSK handshake with KS as premaster secret. For example, such values may be compared to authenticate the M2M unit or device with the end application server or user device. According to an example (e.g., when receiving N), the M2M unit may be able to calculate KS using the stored $iK_{M2M}$ and the received nonce.

In an example, the key $K_{M2M}$ may be used a limited number of times in order not to have the risk of compromising the security of the scheme. As such (e.g., when the K/AS may have generated a certain number of KS from $K_{M2M}$), the K/AS may initiate a key updated session with the M2M unit and, may securely transfer a nonce value and may use the key $KS_{M2M}$ to calculate a new $K_{M2M}$. Further, in an example, the key may be used to perform a M2M unit secure reset in case of a fatal device failure.

In an example, the systems and/or methods for provisioning herein may be based on a public key (e.g., may be public key based). According to such an embodiment, the M2M units may configured at manufacture and deployment time with light-weight public key material such a raw public keys or light weight certificates. The same principle may also be used in accordance with an advanced Public Key Infrastructures (PKI) such as PKIX, and/or other public key based techniques.

This example may include (e.g., an assumption of) using a DTLS protocol to securely identify M2M units or devices and provide secure communication. The same principle may be used using the TLS or the IKE/IPSEC protocols or any other secure identification and/or communication principle.

Figure 12:
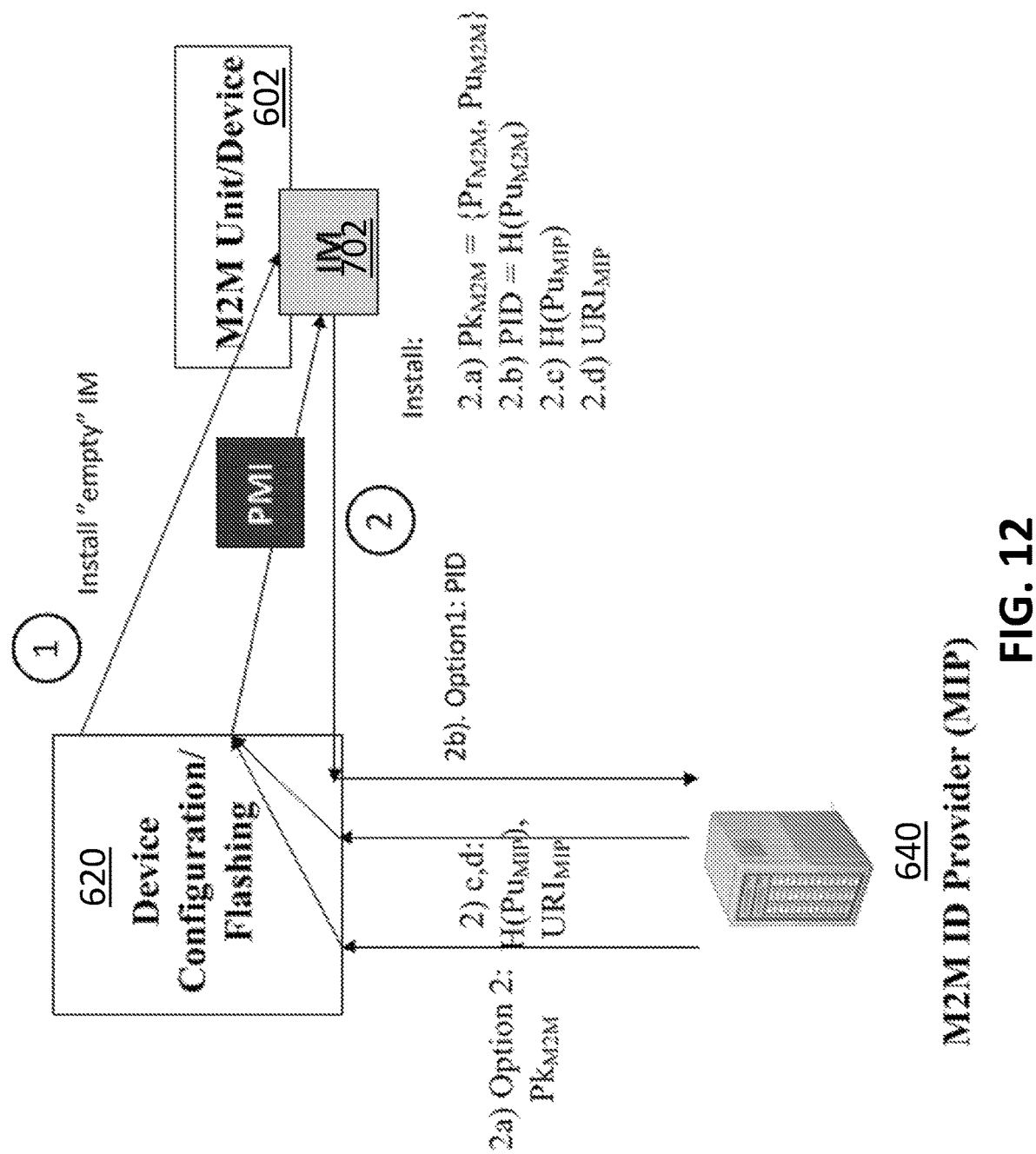
FIG. 12 illustrates an example of a manufacture phase configuration for a public key that may be used in one or more examples described herein.

An example system and/or method of credential provisioning (e.g., that may use a public key or may be public key based) may be provided as described herein (e.g., below) and shown in FIGS. 12-15 (and/or generally in FIG. 6). The method may be similar to that shown in FIGS. 8-11 (e.g., except in one or more examples different information such as keys, URIs, and/or the like may be used for such credential provisioning). In examples, one or more devices (e.g., the M2M unit or device, and/or the like as described herein) may be configured to perform at least part of the method of FIGS. 12-15. As shown in FIG. 12, for example, at 1, the M2M unit (e.g., 602) may be at manufacture and may be configured with basic SW such as firmware, an operating system and/or generic applications (e.g., by a device manufacturer such as 620). The M2M unit may also be provided with an "empty" (e.g., an empty instance of this module may be configured at 1 or in an alternative embodiment, this may be combined with 2 described herein (e.g., below) giving a fully configured module directly) Identity Module (IM) (e.g., 702), which may be a software module running in a protected execution environment on the device. According to an example, this module may provide at least one or more of the following functions (e.g., where such an interface may be based on the PKCS #11 standard). For example, the module may provide secure (e.g., confidentiality and integrity protected) persistent storing of at least one or more of the following parameters: a private and public key of a public key pair that may be used to securely identify the M2M unit, storage of hash or complete raw public keys of an external trusted entity such as the MIP (e.g., 640) or an M2M application domain key and authorization server or a traditional root certificate for a similar or same purpose, a unique identifier, ID, of the M2M unit, a manufacture device key for the M2M unit, a URI (or other network address) of the MIP or K/AS for the IM (e.g., depending on if it is a PIM or final IM), and/or the like. In examples, this module may also be provided with an API towards other software modules running on the M2M unit that may offer or provide through this interface public and private key operations on the parameters described herein (e.g., a private and public key, a hash or raw public keys, a unique identifier or ID, a manufacture device key, a URI, and/or the like described above)

At 2 (e.g., as part of the final M2M unit SW customization), the "empty" IM (e.g., from 1) may be customized with preliminary key material such as the parameters above described herein (e.g., above at 1). During this process the "empty" IM may be transformed to a PIM (e.g., a fully functional PIM). In an example, at least one or more of the following parameters or information may be generated and configured in the IM. For example (e.g., at 2a), M2M private public keys, $PPk_{M2M}$, (e.g., a first M2M private public key pair) may be generated "on board" the M2M unit while trusted public key and/or root certificates may be transferred to the M2M through a manufacture process. Further, in an example, a M2M private public key pair may be transferred to the M2M unit though a manufacture process. In this example, the M2M public key (or a hash of it) may be securely transferred from the manufacture to the MIP as part of the registration process after M2M manufacture (e.g., during M2M unit shipment).

According to an example (e.g., at 2b), a PID may be generated and/or configured in the IM. PID may be a secure one-way hash of the device public key where, for example, $PID=H(Pu_{M2M})$. This value may be transferred through the manufacturer to the MIP (e.g., if option 1 may apply the on board generation option in 2a).

A unique reference, $H(Pu_{MIP})$, to the MIP raw public key or root certificates may be securely provided or sent (e.g., at 2c) to the manufacturer such that it may configure the M2M unit with these parameters (done for a whole batch of M2M units). In an example, the unique reference may be a cryptographically (e.g., strong) one-way hash of the MIP public key or certificate.

In examples, the manufacturer may use (e.g., at 2d) a PFR such as a suitable PRF to calculate a sufficient long manufacturer device key for the unit, $MK_{M2M}$, which may be configured into the IM of the M2M unit. Further (e.g., at 2e), the network identifier, $URI_{MIP}$, of the MIP may be securely configured in the IM of the M2M unit.

Figure 13:
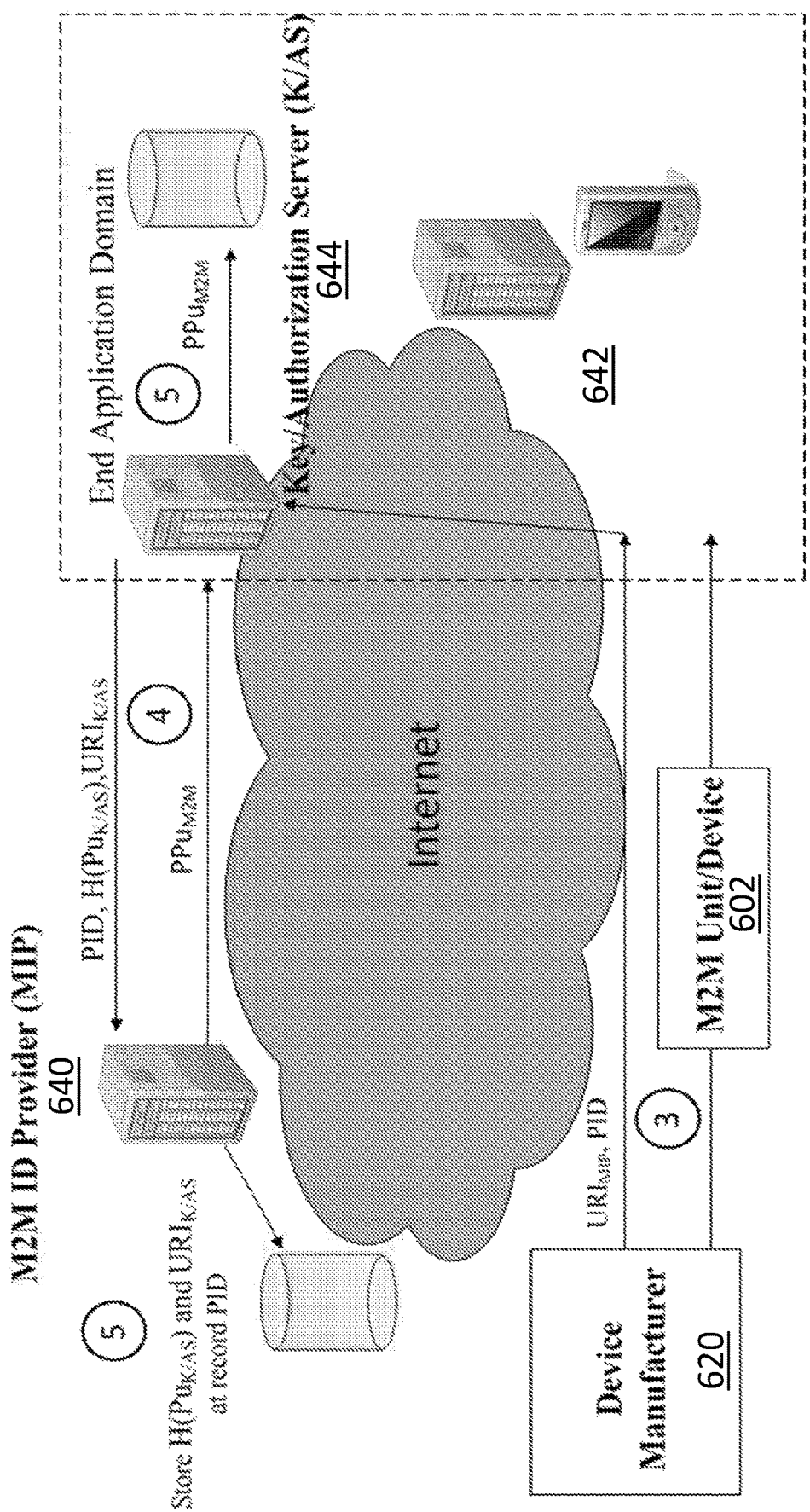
FIG. 13 illustrates an example of a device acquisition phase configuration for a public key that may be used in one or more examples described herein.

As shown in FIG. 13, at 3, the M2M unit (e.g., 602) may be provided to an owner such as a M2M application owner (e.g., via 642 and/or 644 in an end application domain). In an example (e.g., when the M2M unit may be acquired by the M2M application owner), the PID and $MK_{M2M}$ of the M2M unit may be included or provided (e.g., as part of the unit) and/or received from the manufacturer. A reference such as a URI and/or the like to the MIP responsible for the preliminary M2M unit credential registration may also be provided or included and/or received. The M2M application unit may further include or receive (e.g., at 3) an electronic certificate that may certify that the application owner really may be the true owner of the acquired M2M unit.

At 4, the K/AS (e.g., 644) may connect or communication with the MIP (e.g., 640) over an interface such as a secure channel. For example, the M2M application owner operating the M2M unit may contact the MIP over a secure channel to establish communication between the M2M unit and MIP. The PID may be sent to the MIP (e.g., via the channel or interface that may be established). The M2M unit (e.g., via K/AS) may receive or get in return from the MIP a unique reference to the preliminary public key of the M2M unit, $Pu_{M2M}$ (e.g., where the $Pu_{M2M}$ may be a public key part of $PPk_{M2M}$). According to an example, the certificate (e.g., that may be received at 3) may be sent to the MIP to prove that the M2M application owner may be an actual owner of the subject M2M unit. Additionally (e.g., as shown at 4), at least one or more of the following information may be transferred to the MIP: the network identifier, $URI_{K/AS}$ address of the application owner key and/or authorized server K/AS, a unique reference, $H(Pu_{K/AS})$ (e.g., a reference that may be based on a public key associated with K/AS), to a raw public key or root certificate of the K/AS, and/or the like. According to an example, a private key may also be provided and/or used including, for example, as a private key part of $PPk_{M2M}$ (e.g., $Pr_{M2M}$).

In an example, at 5, the MIP store the information such as the network identifier, $URI_{K/AS}$ address of the application owner key and/or authorization server K/AS, a unique reference, $H(Pu_{K/AS})$, to a raw public key or root certificate of the K/AS, and/or the like (e.g., transferred at 4). In an example, the information may be stored together with the record of the M2M with PID and the K/AS may store the reference to $PPk_{M2M}$ at the PID M2M record.

Figure 14:
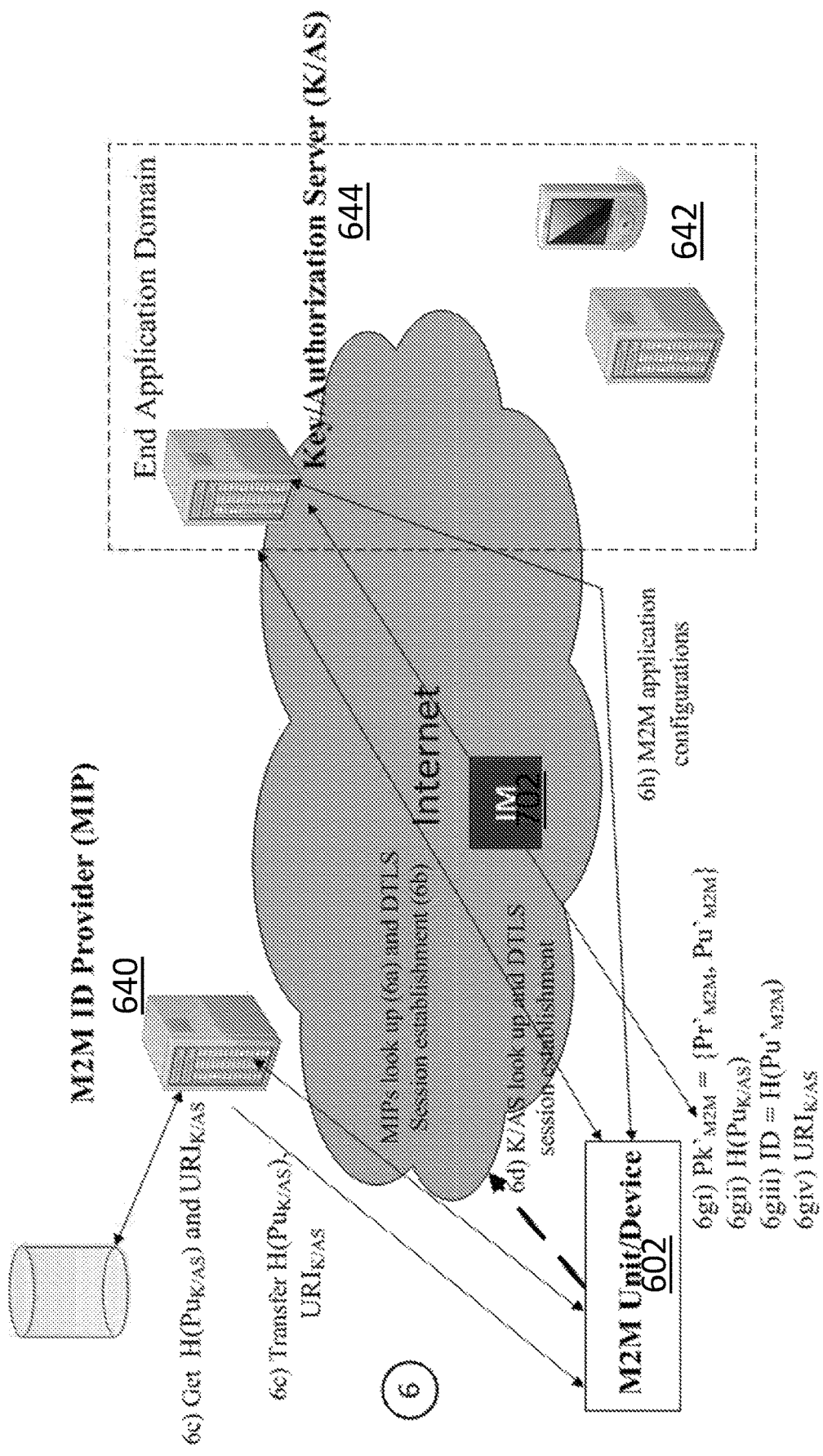
FIG. 14 illustrates an example of a device deployment phase configuration for a public key that may be used in one or more examples described herein.

As shown in FIG. 14, at 6 (e.g., at M2M first time device deployment, for example, directly after the M2M unit may have full Internet access for the first time), at least one or more of the following may be performed or may take place. For example (e.g., at 6a), the M2M unit may use the URI of MIP to determine and contact the MIP it may belong to or be associated with. Additionally (e.g., using the PIM), the M2M unit and the MIP establish a secure DTLS connection (e.g., at 6b). In an example (e.g., at 6c), the MIP may determine and/or look up a record of the M2M unit and the information transferred such as such as the network identifier, $URI_{K/AS}$ address of the application owner key and/or authorization server K/AS, a unique reference, $H(Pu_{K/AS})$, to a raw public key or root certificate of the K/AS, and/or the like (e.g., shown at 4).

The M2M unit (e.g., 602) may use the information (e.g., received at 6a) to determine or look up the K/AS and establish a secure DTLS connection with the K/AS (e.g., at 6d). The M2M unit may be authenticated in the DTLS handshake using the M2M public key reference received (e.g., at 4) and the corresponding private keys in the PMI and K/AS respectively.

According to an example (e.g., at 6e), the M2M unit may use a secure challenge response protocol to make sure that the K/AS may have knowledge of the device manufacture key $MK_{M2M}$. In one example (e.g., if the challenge response may fail), the M2M unit may abort the registration process with an error message or the procedure may be continued, but the device owner (e.g., via an output or indication on the M2M unit) may be warned that the MIP may be trying to compromise the M2M unit.

A unique ID for the M2M unit may be selected or chosen (e.g., at 6f) by the K/AS (or it may keep its old PID). Further (e.g., at 6f), the IP address such as IPv6 or IPV4 of the M2M units may be recorded by the K/AS and stored together with the M2M ID and the rest of the M2M information in a suitable database or storage component.

According to an example, the M2M unit may support one or more IMs (e.g., 702) including multiple IMs and (e.g., at 6g) the key material, and/or the like that may be used customize (e.g., fully customize a new IM may be transferred from the K/AS to the M2M unit) based on one or more of the following. In an example (e.g., if the "on board" key generation example may be used), the key reference may also be transferred back to the K/AS. Additionally (e.g., if multiple IMs may not be supported), this information may replace the old PIM on the M2M unit in the IM (e.g., 702).

For example, to customize, a private and public key of a public key pair, $Pk'_{M2M}=\{Pr'_{M2M}, Pu'_{M2M}\}$, may be used to secure identify the M2M unit (or in an alternative or additional example this information may be generated "on board" the M2M unit and then the public key or a unique reference to this public key may be transferred to the K/AS) (e.g., as shown at 6gi). The $Pk'_{M2M}$ may be a second (e.g., a final customization) M2M unit private public key pair where, for example, $Pu'_{M2M}$ may be a public key part of $Pk'_{M2M}$ and $Pr'_{M2M}$ may be a private key part of $Pk'_{M2M}$.

Further (e.g., as shown at 6gii), a hash or complete raw public keys of K/AS and the other entities that may utilize the service may be sent or provided to the M2M unit, for example, within the application domain to customize. According to an example (e.g., if the number of entities within the domain may be large), a root certification such as a traditional root certificate of the K/AS may be transferred.

According to an example (e.g., at 6giii), a unique permanent identifier ID in the form of a secure one-way hash of the M2M public key, $ID=H(Pu'_{M2M})$ and/or (e.g., at 6giv) permanent URI (or other network address) of the K/AS may be provided to the M2M unit or sent thereto, for example, for customization.

The M2M unit may be configured (e.g., at 6h) for the particular M2M application domain with application specific configuration information and SW. In an example, this information is transferred protected under the established DTLS connection.

Figure 15:
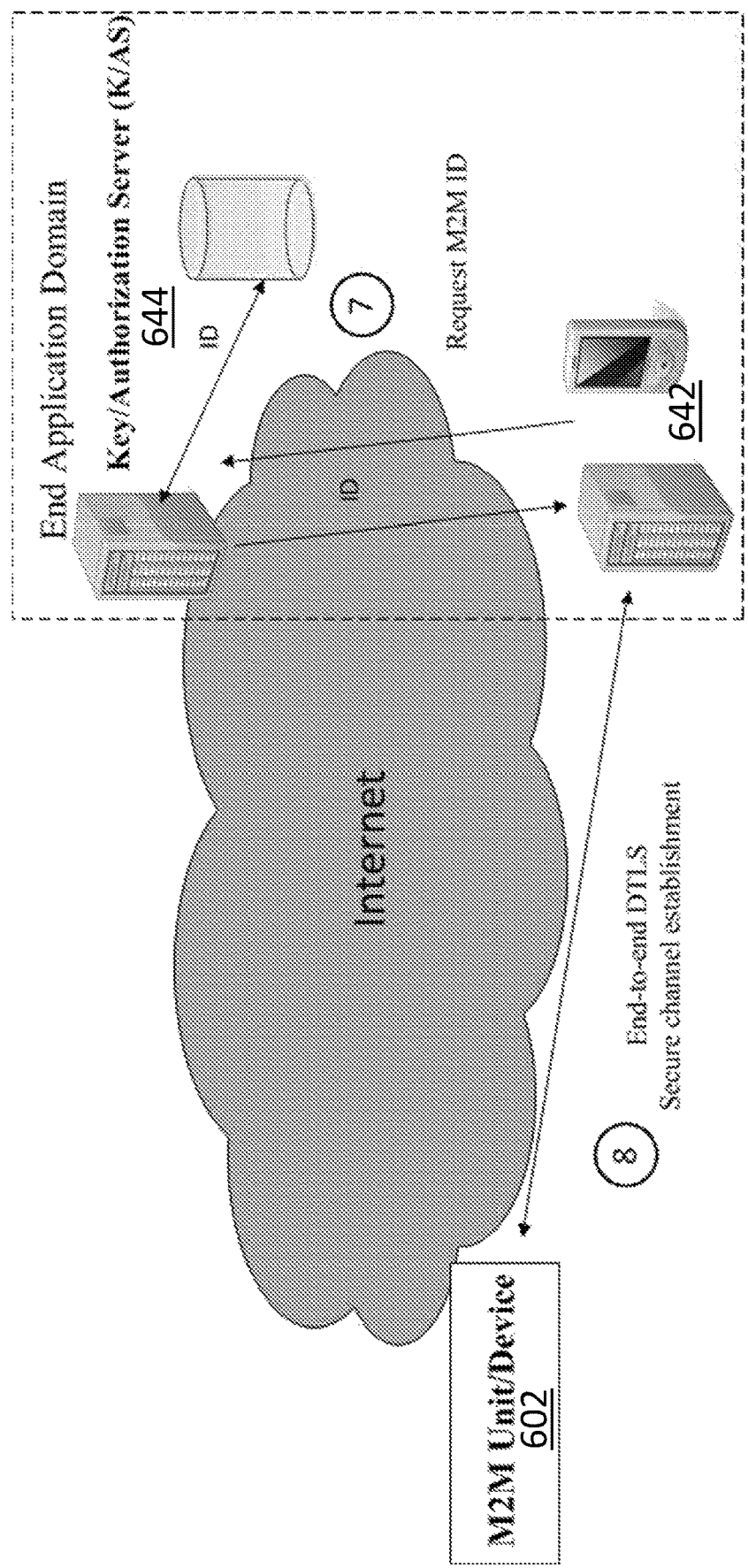
FIG. 15 illustrates an example of a M2M secure channel set-up for a public key that may be used in one or more examples described herein.

According to an example (e.g., when the end user application server or user device may want to communicate with a certain M2M unit), the application or user device may determine or look up its address and may contact the K/AS as shown in FIG. 15, for example, at 7. In examples herein, the K/AS and the application server or user device may be one entity or the same physical unit and/or as described herein separate entities. According to an example, the K/AS may further or also function as a M2M unit discovery server that may be used to find a certain service or particular M2M unit. The application or user device may also receive or get a unique reference to the raw public key material that may be used by the M2M for secure communication and/or, in an example (e.g., optionally), an authorization token from the K/AS that used to get access to particular services provided by the M2M unit (e.g., at 7).

The end user application server or user device (e.g., 642 at 8) may contact or communicate with the M2M and may set up a secure DTLS connection with the M2M unit with mutual authentication. The M2M unit may use the credential information (e.g., received at 6f) for this authentication while the end user application server or user device may use the M2M credential information (e.g., obtained at 7).

In an example, ID module protection may be provided for provisioning as described herein. For example, an aspect of the examples herein may be how the IM in the M2M unit actually may be provided. As described herein, the IM may be protected from internal SW attacks as well as from network based attacks in order to not compromise the long term M2M secret that may be used to securely identify the M2M unit and to set up secure connections with external entities. This may indicate or imply that a secure execution environment may be available where the IM application may run. In examples herein, there may be different implementation options for such ID module protection.

Figure 16:
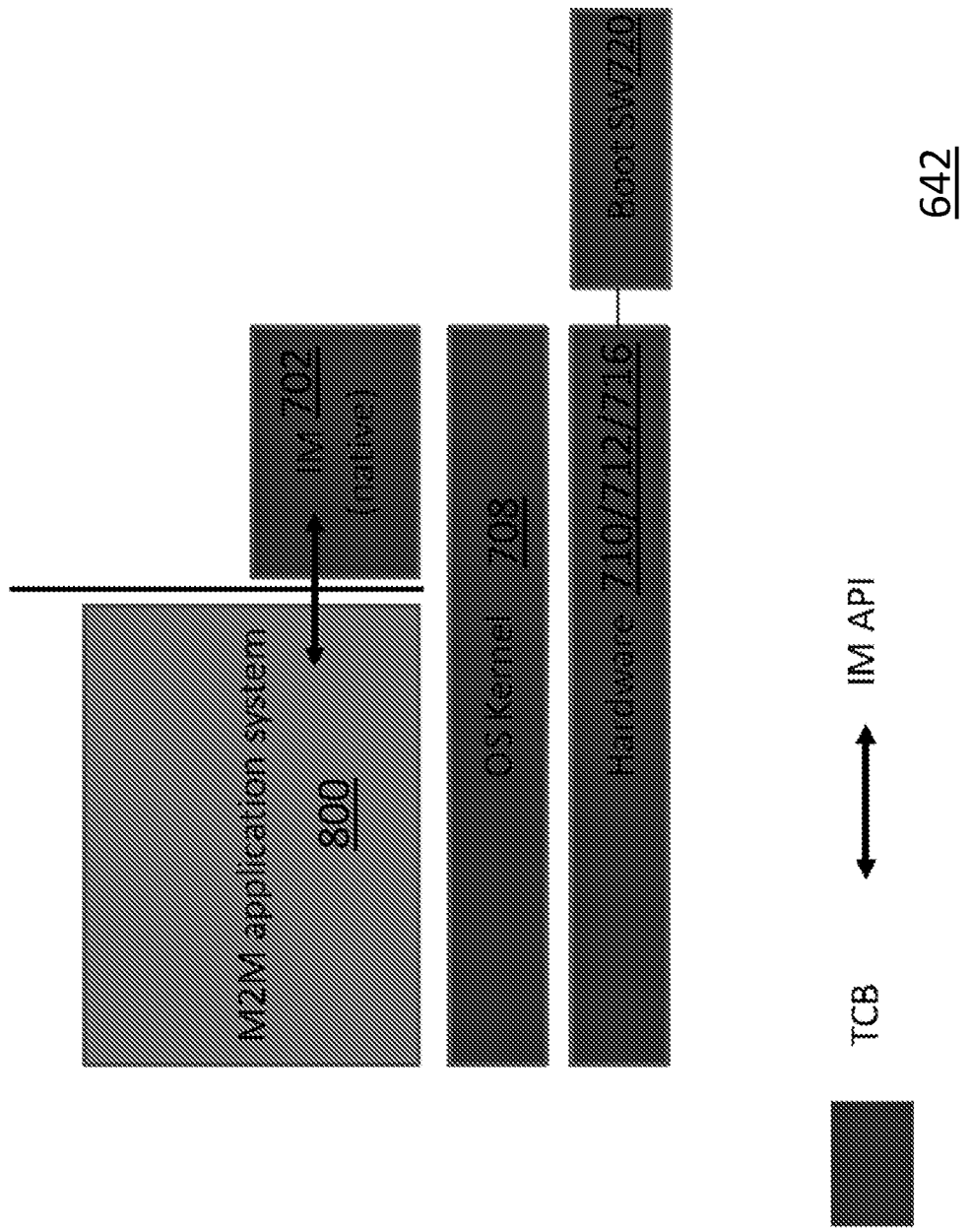
FIG. 16 illustrates an example of an identity module (IM) that may be used in an operating system (OS) implementation according to one or more examples described herein.

According to an example (e.g., in an first implementation), a traditional OS may be used. For example, the IM may be run (e.g., directly) upon a standard operation system such as Linux, iOS, Windows Unix or a real time OS such as FreeRTOS and/or the like as a native application. This example may be shown in FIG. 16. The IM 702 may use one or more isolation properties offered by a standard OS kernel 708 and a secure boot process (is this the boot SW in FIG. 16) of the complete OS and this secure boot process may be used to protect the IM from modification at system start-up. For example, the IM 702 may be part of a trusted computing base separate from the M2M application system 800 (e.g., that may include applications 714 and/or the application framework 704) that may be non-trusted. The TCB may include the IM 702, the OS kernel 708, one or more hardware components (e.g., such as 710, 712, 716, and/or the like as shown in FIG. 7) of the M2M unit or device (e.g., 602) and a secure boot 720 for software. Being part of the TCB as shown may enable protection of the IM from modification in one or more examples herein. Using this example may be cheaper as standard software and hardware may be used and it may be easily provided on multiple systems. On the other hand, the security level may not be a high (e.g., it may not be particularly high) as a trusted computing base (TCB) may be larger. In this example, it may also be easier to provide multiple different IM instances on the system. The different IM instances may be protected by the ordinary OS kernel isolation techniques or methods.

Figure 17:
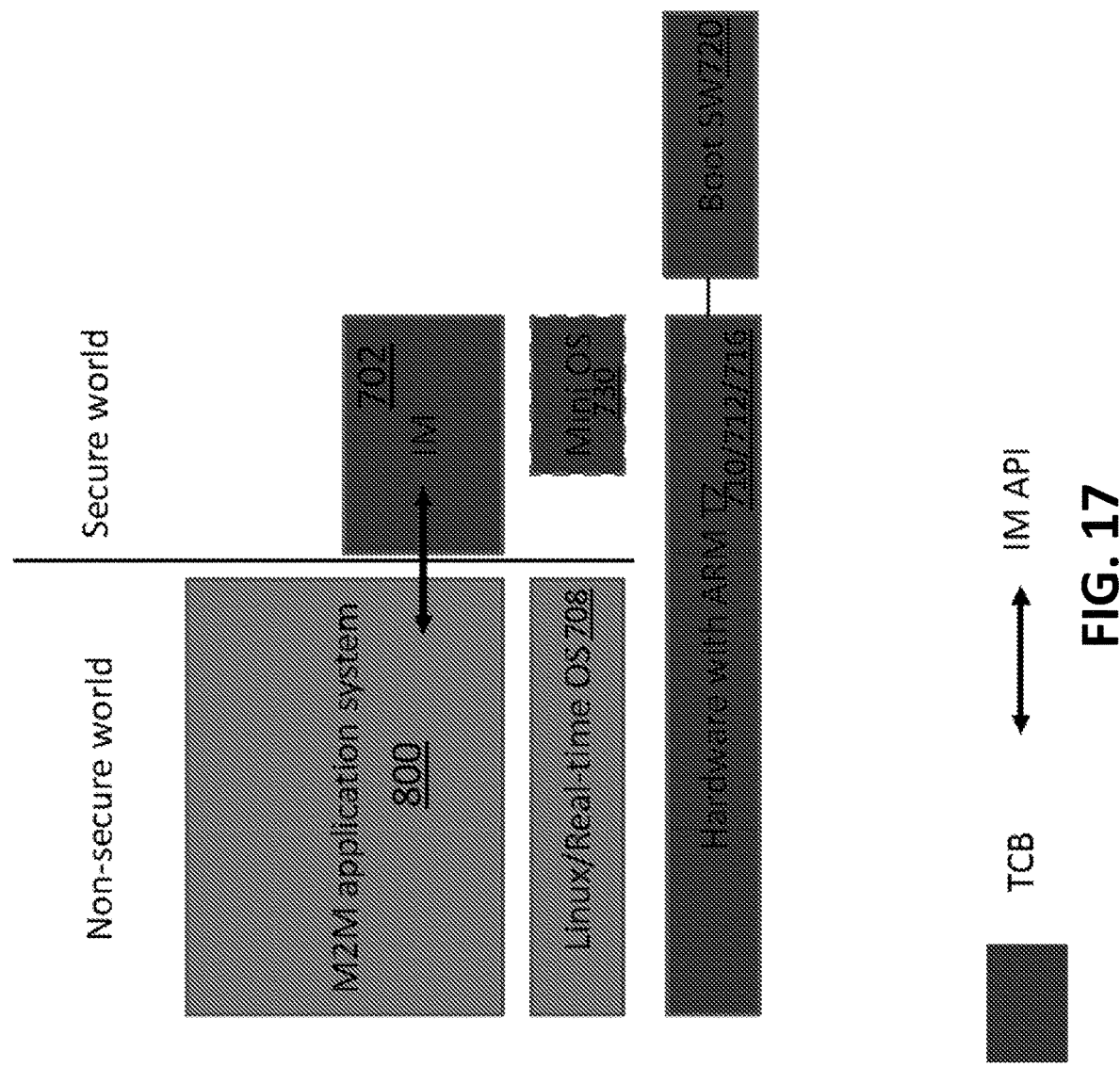
FIG. 17 illustrates an example of an IM that may be used in an ARM TZ implementation according to one or more examples described herein.

In an example (e.g., in a second implementation), TrustZone may be used. For example, an ARM TrustZone (TZ) technology may be used. The ARM TZ technology may be a system on chip (SoC) based secure isolation mechanism that may enable or allow running security critical applications in dedicated execution environment (e.g., a secure world). The applications running in the secure world may be reached by the applications in the non-secure world through a dedicated hardware protected API. The TCB may be smaller and may use a secure boot process of the secure world in addition to adapted SoC hardware. This example may be possible for system with SoC TZ support where, for example, adaptation of SoC hardware peripherals may be used give the promised security level. In a TZ system, in an example, the IM may be run as a dedicated application in the secure world as shown in FIG. 17. For example, the IM 702 may be part of a trusted computing base separate from the M2M application system 800 (e.g., that may include applications 714 and/or the application framework 704) and/or an OS 708 that may be non-trusted. The TCB may include the IM 702, a mini OS 730, one or more hardware components that may support ARM TZ in an example (e.g., such as 710, 712, 716, and/or the like as shown in FIG. 7) of the M2M unit or device (e.g., 602) and a secure boot 720 for software. According to an example (e.g., given that a min-OS with better or improved separation properties may be provided), this example may enable or allow running multiple parallel IMs on a single system.

Figure 18:
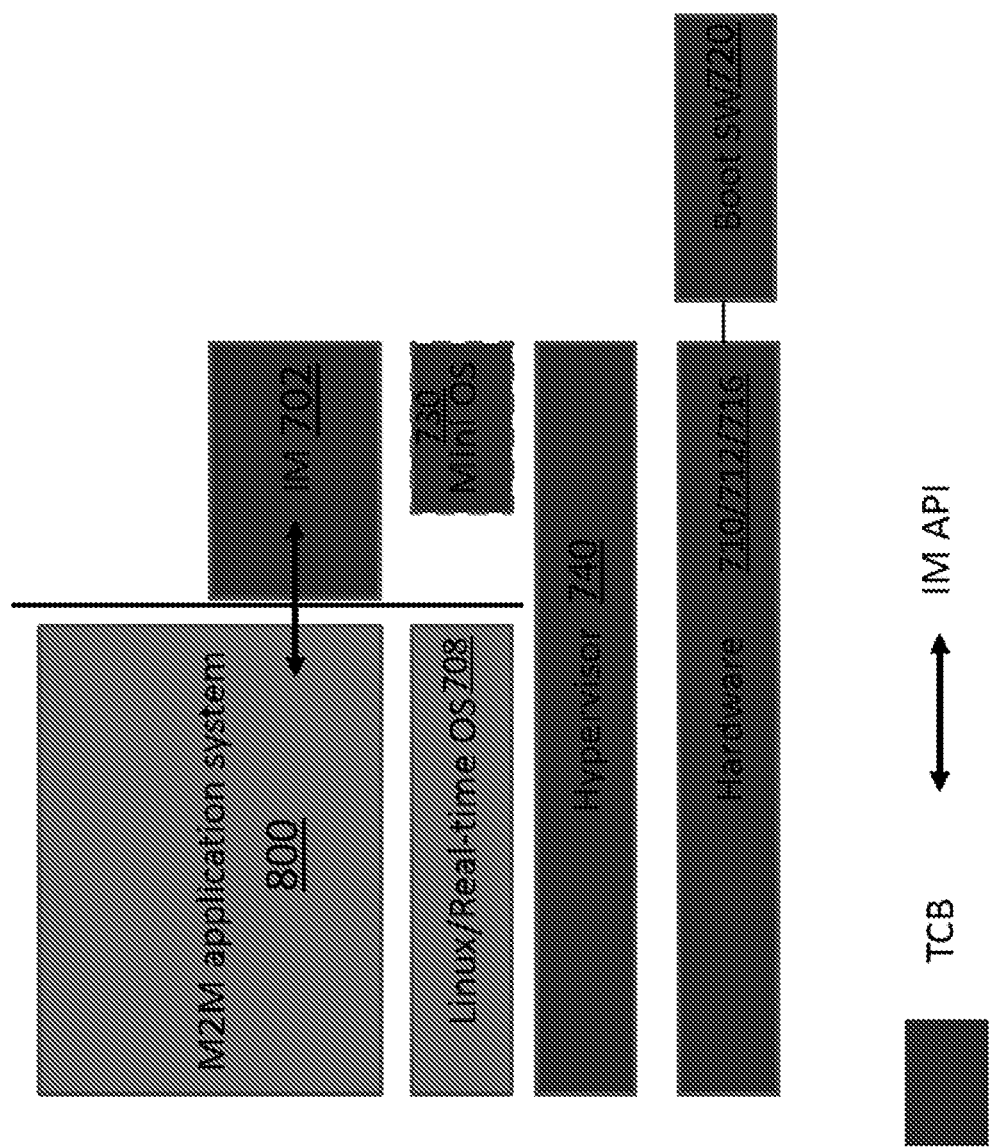
FIG. 18 illustrates an example of an IM that may be used in a virtualized system implementation according to one or more examples described herein.

According to another or additional example (e.g., a third implementation), virtualization-based IM module protection may be used. For example, the IM may be run in a dedicated Virtual Machine (VM) that may be protected from the rest of the system through the isolation properties provided by a virtualization layer such as a hypervisor or separation kernel. This principle may be illustrated in FIG. 18. For example, the IM 702 may be part of a trusted computing base separate from the M2M application system 800 (e.g., that may include applications 714 and/or the application framework 704) and/or an OS 708 that may be non-trusted. The TCB may include the IM 702, a mini OS 730, a hypervisor 740, one or more hardware components (e.g., such as 710, 712, 716, and/or the like as shown in FIG. 7) of the M2M unit or device (e.g., 602) and a secure boot 720 for software. In this example, the M2M applications may be running in a dedicated VM and the IM application in another VM. The hypervisor may provide the IM API through RPC calls or though the offering of share memory buffers from the none-secure VM to the secure VM. According to an example, the security of the system may be dependent on a secure boot process of the hypervisor layer as well as the whole VM where the IM may be running as well as the IM itself. Multiple, isolated IM applications may be provided by running them in different protected (e.g., by the hypervisor) VMs. This may be an example that may provide a higher level of security and may be implemented resource constraint devices without TZ support (e.g., devices with memory management unit (MMU) and/or memory protection unit (MPU) support).

Figure 19:
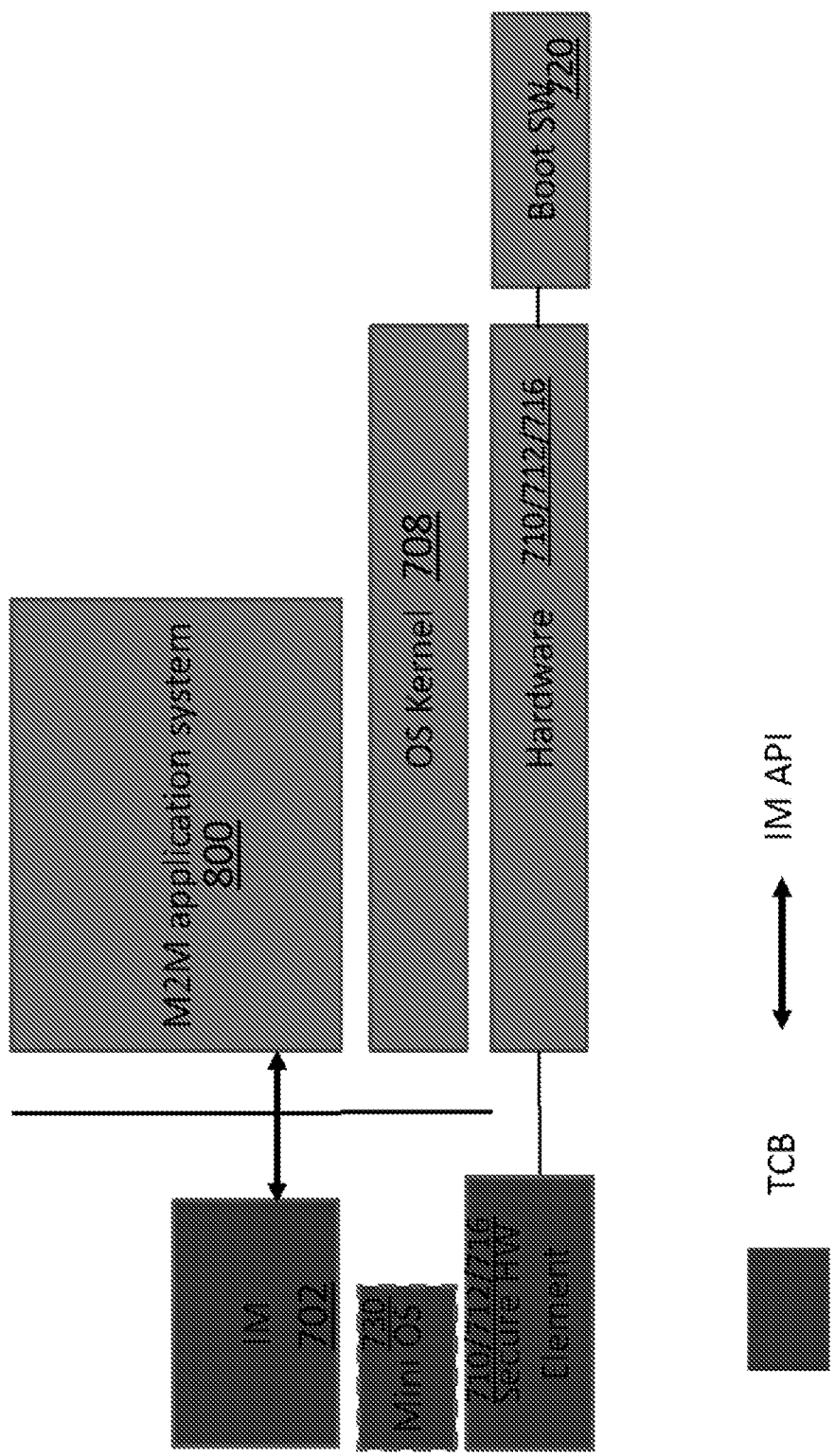
FIG. 19 illustrates an example of an IM that may be used in a dedicated secure hardware element implementation according to one or more examples described herein.

Further, in an example (e.g., a fourth implementation), a dedicated hardware module may be use for IM protection. For example, the IM may be run on a dedicated special purpose hardware module such as smart card or an SoC specific secure element as shown in FIG. 19. For example, the IM 702 may be part of a trusted computing base separate from the M2M application system 800 (e.g., that may include applications 714 and/or the application framework 704), an OS 708, one or more hardware components (e.g., such as 710, 712, 716, and/or the like as shown in FIG. 7) of the M2M unit or device (e.g., 602) and a boot 720 for software that may be non-trusted. The TCB may include the IM 702, a mini OS 730, a hypervisor 740, and/or a secure hardware element (e.g., that may include one of 710, 712, 716, and/or the like as shown in FIG. 7 with one or more of the other hardware components bing non-trusted) of the M2M unit or device (e.g., 602). This example in FIG. 19 may isolate the IM (e.g., completely) from the potential hostile general system and the communication that may be allowed from the M2M application to the IM module may be the communication that may be given by the hardware interface to the secure element. Depending on the hardware capabilities (e.g., the MMU, MPU, and/or the like) of the secure element, it may be possible to run multiple different IM instances on the system or not. In an example, a drawback may include the extra secure element hardware cost for the M2M unit.

Figure 20:
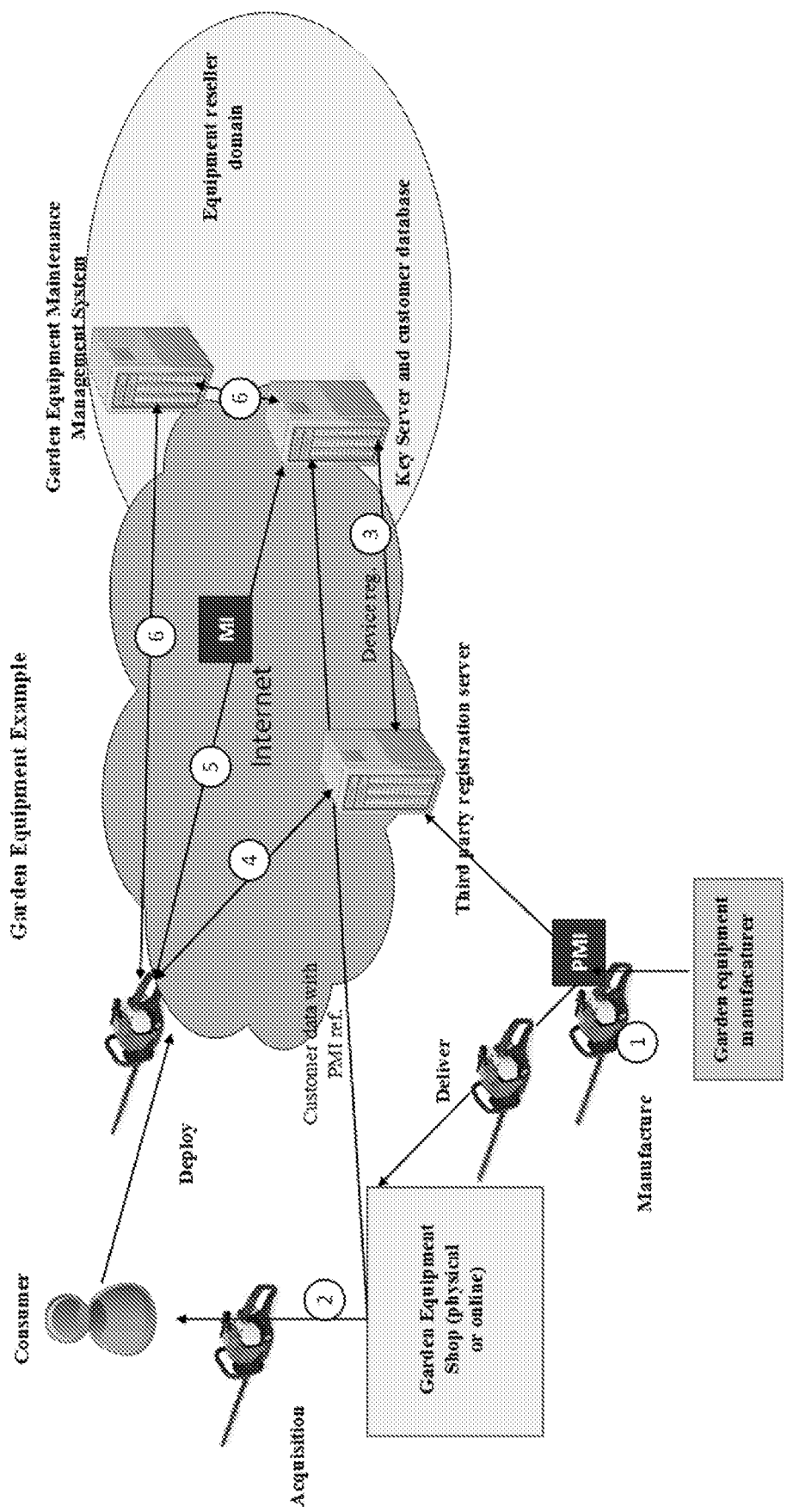
FIG. 20-21 illustrate example systems in which one or more of the examples herein may be implemented.
Figure 21:
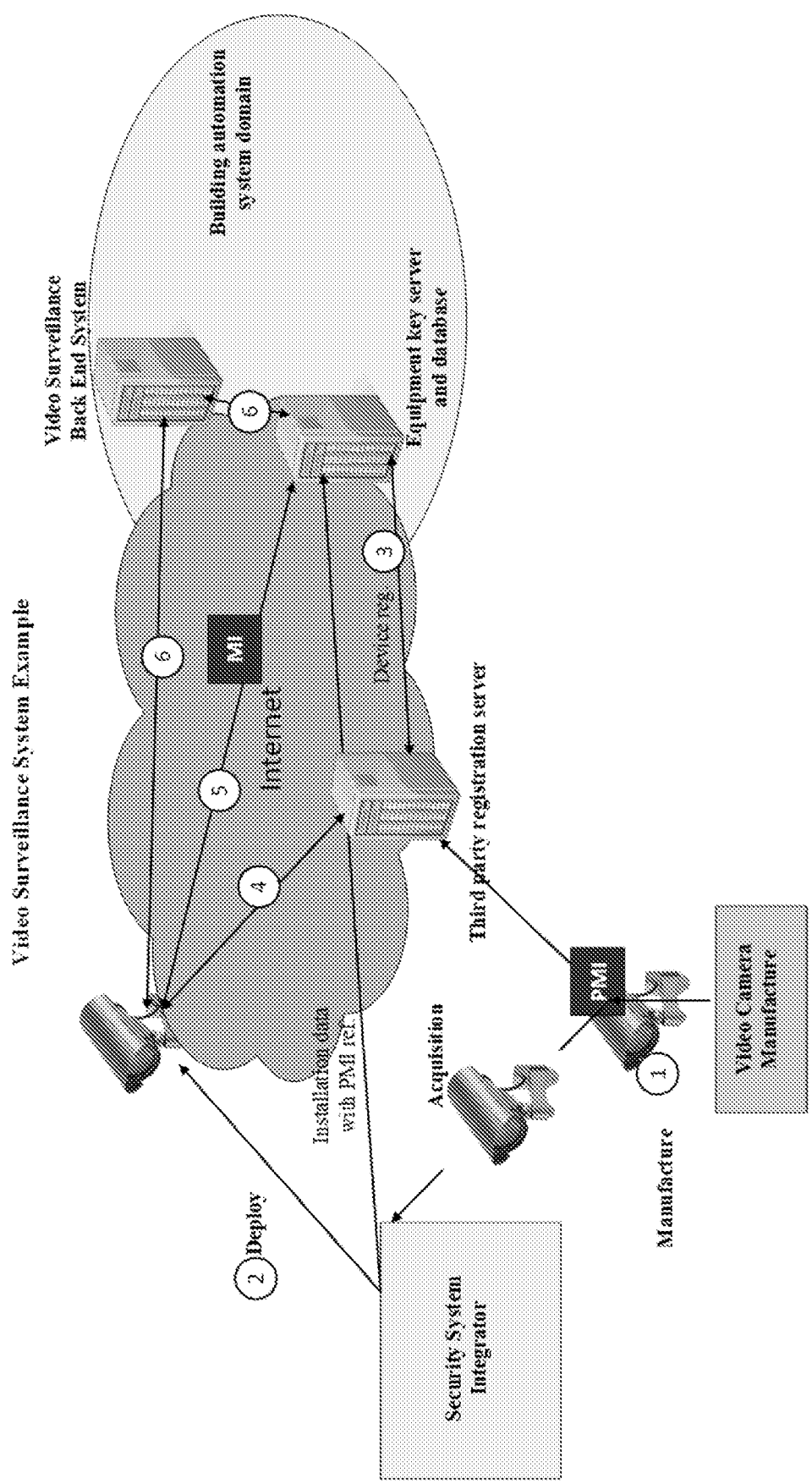

FIG. 20-21 illustrate example systems in which one or more of the examples herein may be implemented. As shown in FIG. 20, one or more examples herein may be implemented in a garden equipment system 900. In such an example, a piece of garden equipment may be a M2M unit or device as described herein (e.g., 602). At 1, the garden equipment (e.g., as shown as a hedge trimmer) may be set up with a software flash in factory such that the equipment may be equipped with software based preliminary credentials, PMI, as described herein. The PMI information may be (e.g., at the same time) sent to an independent third party registration service (e.g., such as the MIP 640).

At 2 (e.g., when a reseller sells the equipment to an end-customer), the reseller (e.g., at the same time) may register a unique reference to the PMI of the reseller together with customer information (e.g., may include information) in its customer and device key database (e.g., 644).

At 3, the equipment may then be registered as "belonging" to the subject reselling organization through a registration request at the third party registration service.

At 4 (e.g., when the customer for the first time may use the new equipment or hedge trimmer, the equipment may connect (e.g., automatically) to the Internet. The equipment (e.g., upon connecting) may determine or looks up the third party registration service and may receive or credential information for connecting to the reselling management system key server for long-term credentials provisioning (e.g., the MI) as described herein.

The equipment may use the information sent and received at 4 to securely connect to the reselling organization's key server (e.g., 644) to receive a long term device credentials such as the MI at 5.

At 6, the equipment may (e.g., securely and/or regularly) connect to a reselling organization's maintenance service that may provide device status so that the reselling organization may assist the customer with maintenance and device repair requests and help. The may is authenticated using the MI credentials stored at the key server in the reselling domain as described herein.

As shown in FIG. 21, one or more examples herein may be implemented in a video surveillance system 900. In such an example, a video surveillance camera may be a M2M unit or device as described herein (e.g., 602). At 1, the camera may be set up with a software flash in factory such that the camera may be equipped with software based preliminary credentials, PMI, as described herein. The PMI information may be (e.g., at the same time) sent to an independent third party registration service (e.g., such as the MIP 640).

At 2 (e.g., when a security system integrator may acquire the camera), a system integrator (e.g., at the same time) may register a unique reference to the PMI in a building automation back-end system and/or equipment database (e.g., which may be responsible for managing the camera).

In an example, at 3, the camera may then be registered as "belonging" to the subject building automation system that may use the camera through a registration request at the third party registration service (e.g., 640).

At 4 (e.g., when the system integrator may install the new camera), the camera may (e.g., automatically) connect to the Internet. The camera (e.g., upon connecting) may determine or looks up a third party registration service and may receive credential information for connecting to the building automation key server (e.g., 644) for long-term credentials provisioning.

At 5, the camera may use the information received (e.g., at 4) to securely connect to the building automation key server to receive long term device credentials such as MI.

The back-end system and/or the camera therein or associated therewith may use the long term credentials, MI, to securely remotely manage the video camera and/or to send real-time video data over a secure channel between the camera and the back end system.

Figure 22A:
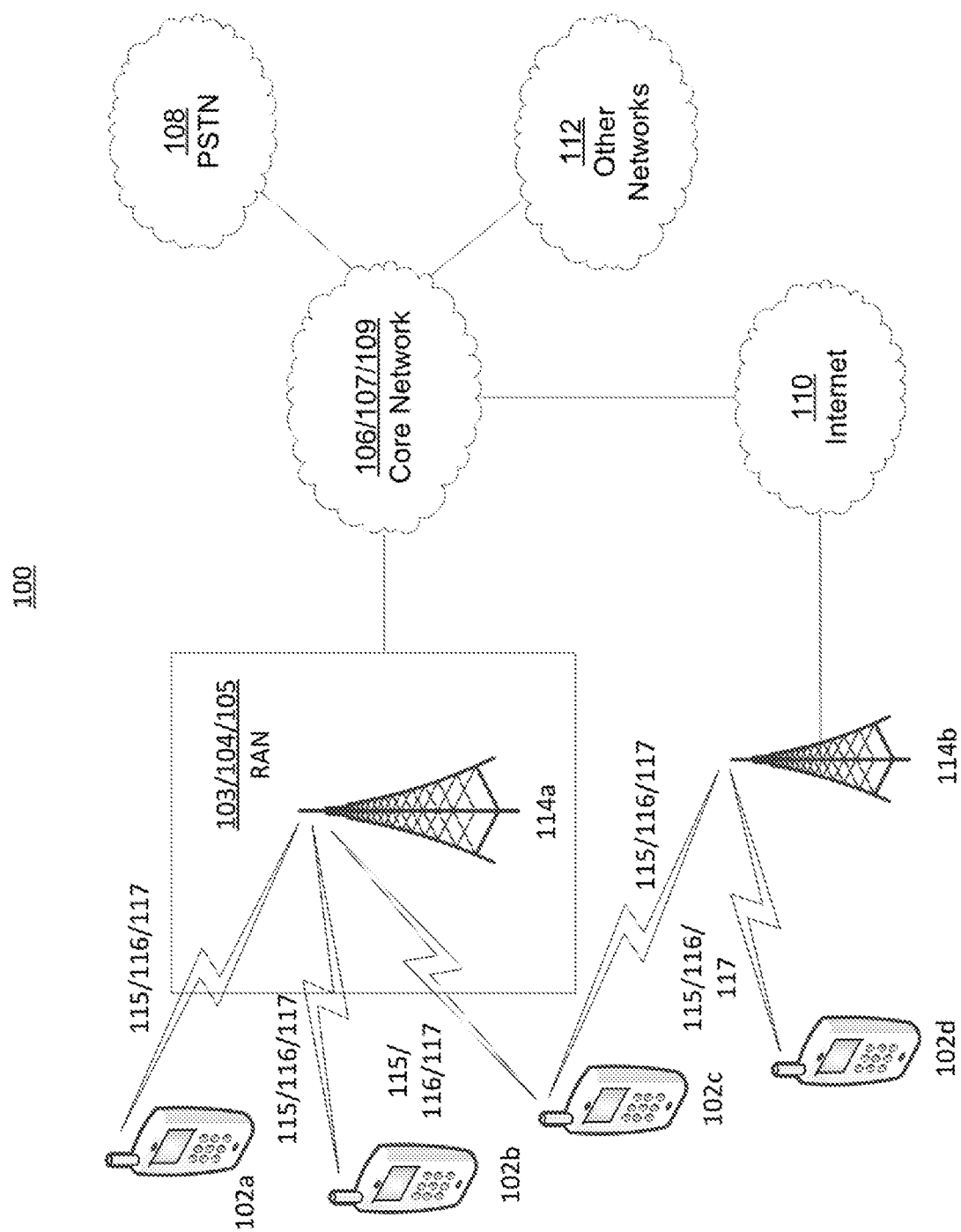
FIG. 22A depicts a diagram of an example communications system in which one or more disclosed examples may be implemented and/or may be used with one or more of the examples described herein.

FIG. 22A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 22A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 22A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 22A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 22A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 22A may be configured to communicate with the base station 114a, which may employ a cellular-based radio technology, and with the base station 114b, which may employ an IEEE 802 radio technology.

Figure 22B:
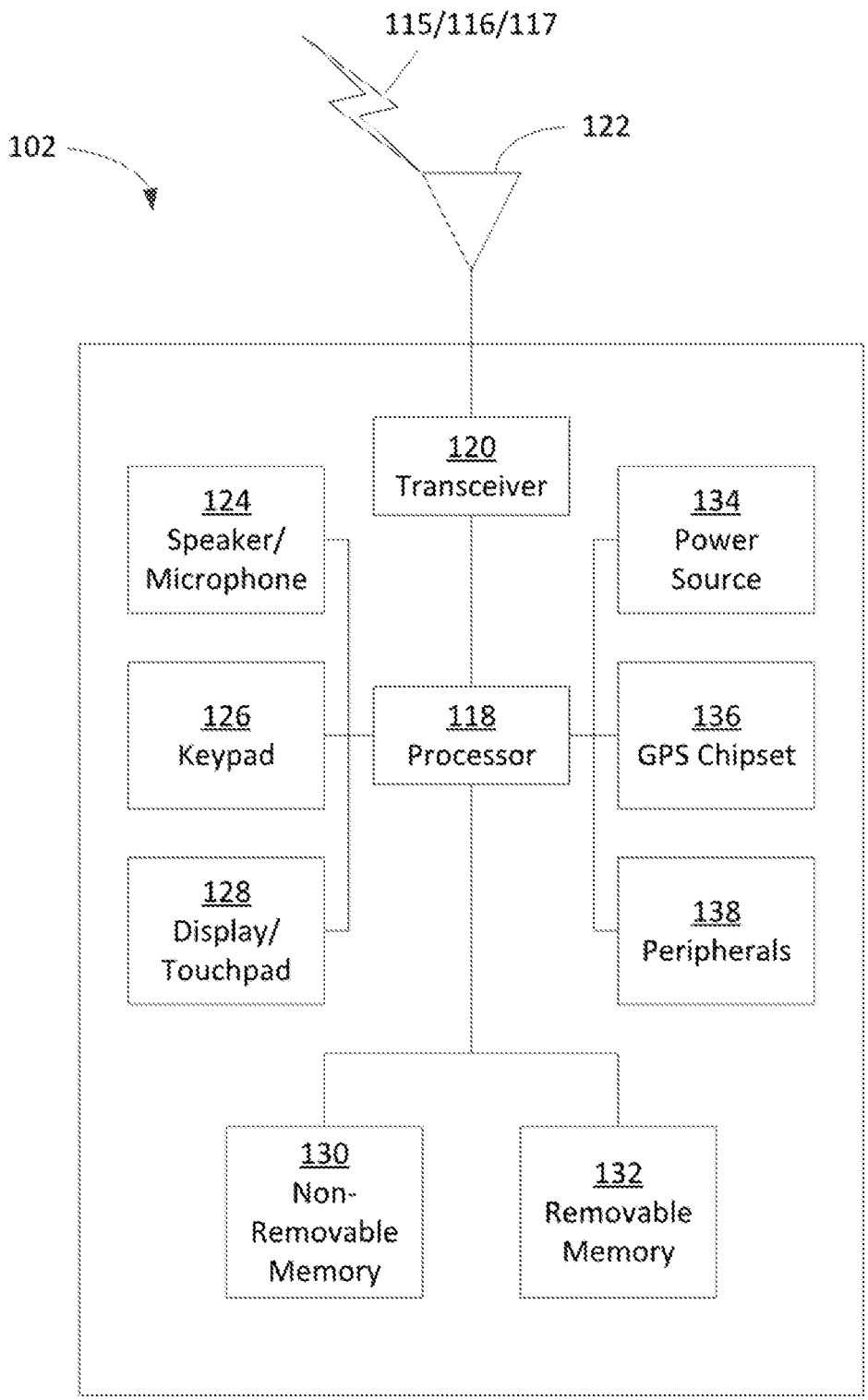
FIG. 22B depicts a system diagram of an example wireless transmit/receive unit (WTRU) that may be used within the communications system illustrated in FIG. 22A.

FIG. 22B depicts a system diagram of an example WTRU 102. As shown in FIG. 22B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 22B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 22B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 22B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 22C:
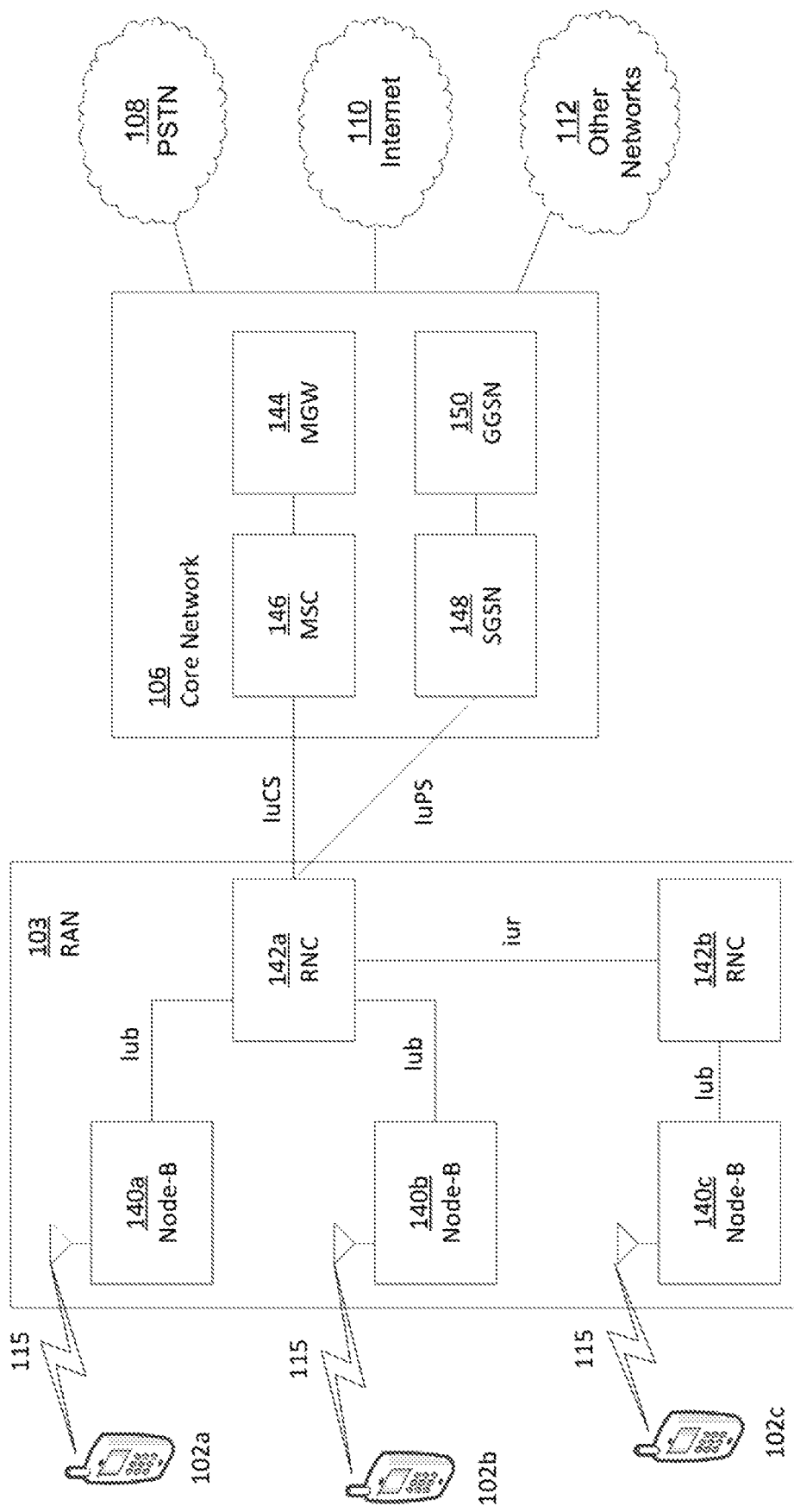
FIG. 22C depicts a system diagram of an example radio access network and an example core network that may be used within the communications system illustrated in FIG. 22A.

FIG. 22C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 22C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 22C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 22C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 22D:
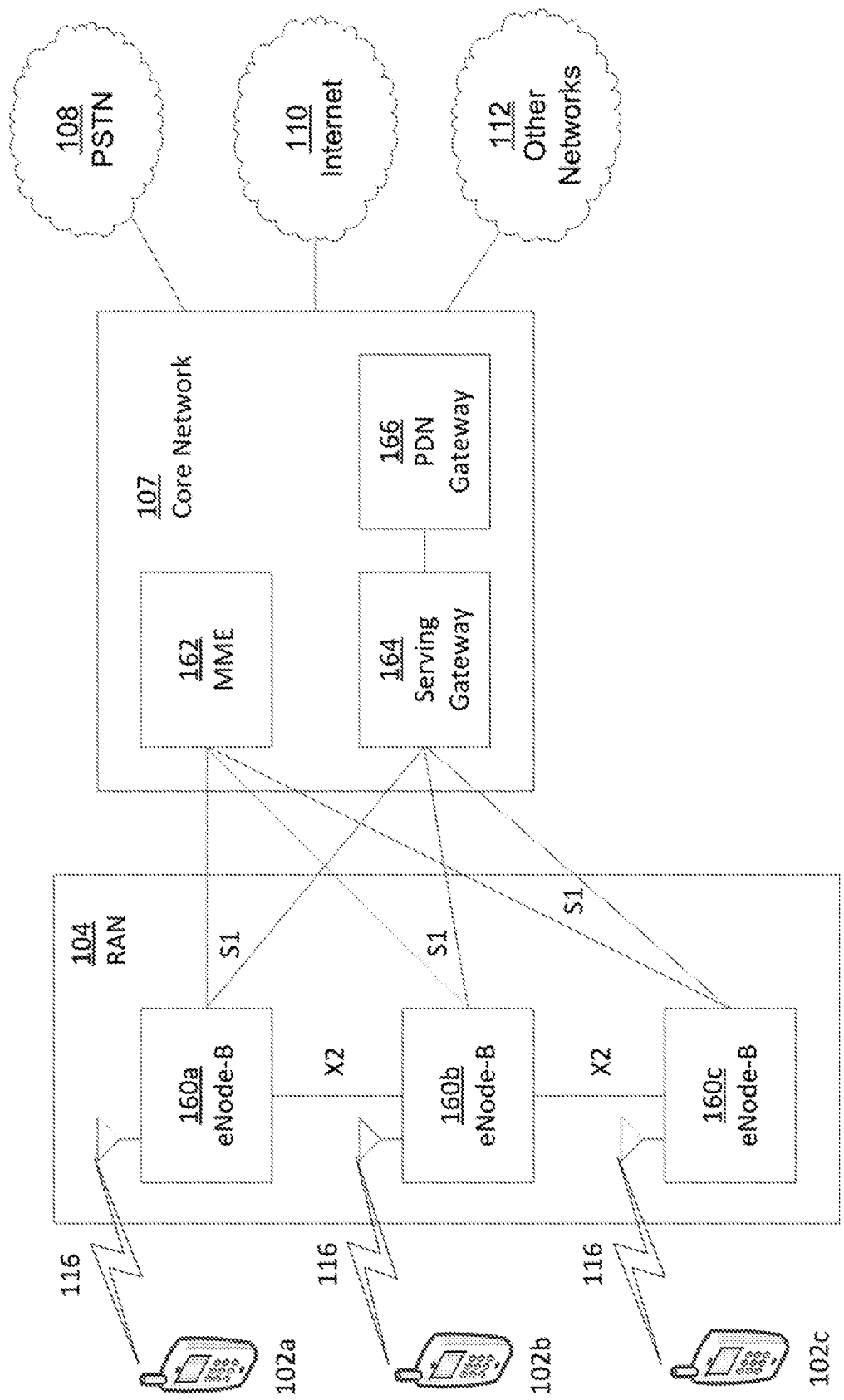
FIG. 22D depicts a system diagram of another example radio access network and an example core network that may be used within the communications system illustrated in FIG. 22A.

FIG. 22D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 22D, the eNode-Bs 160a, 160b, and/or 160c may communicate with one another over an X2 interface.

The core network 107 shown in FIG. 22D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 22E:
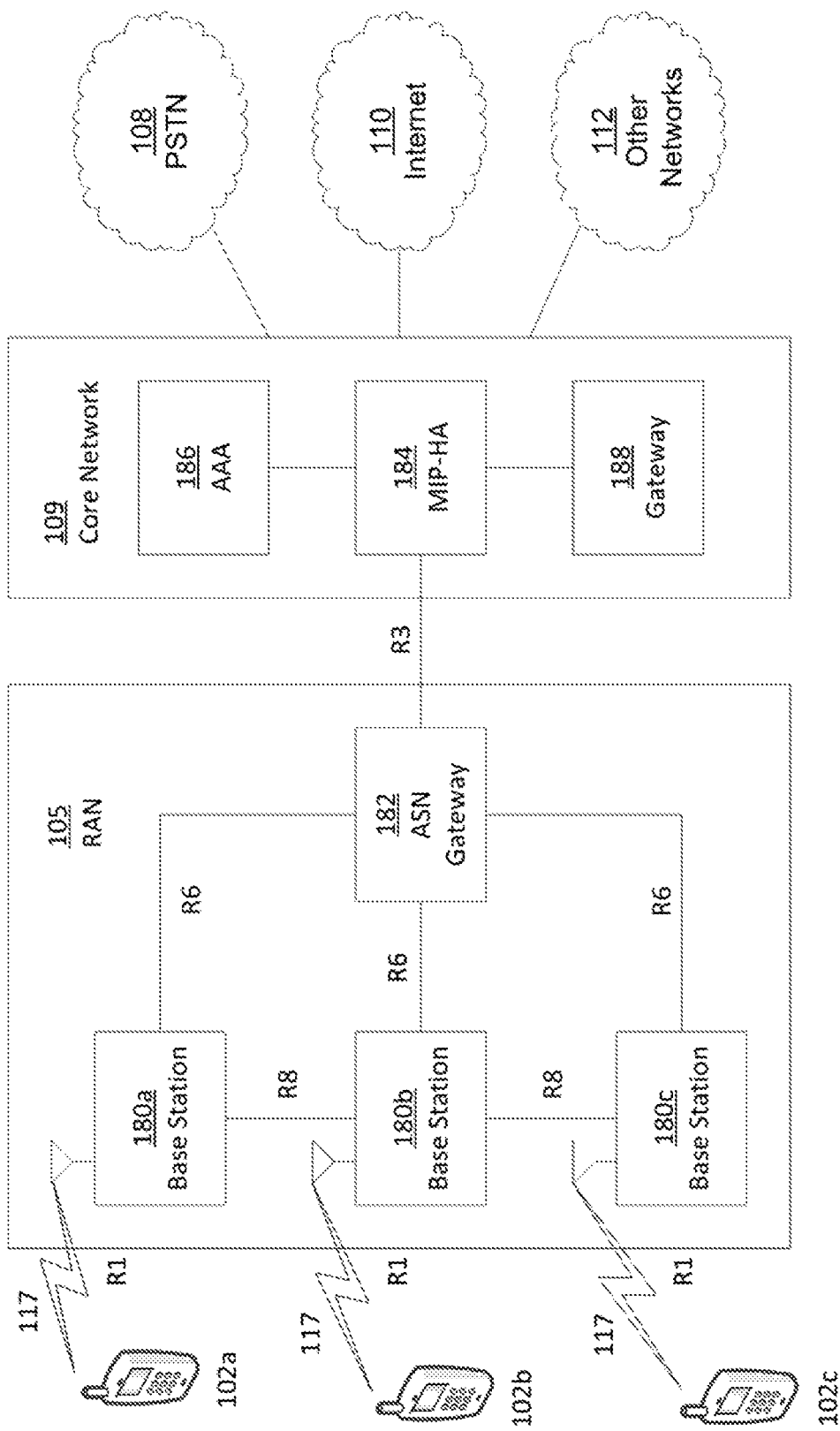
FIG. 22E depicts a system diagram of another example radio access network and an example core network that may be used within the communications system illustrated in FIG. 22A.

FIG. 22E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 22E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 22E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 22E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although the terms device, UE, or WTRU may be used herein, it may and should be understood that the use of such terms may be used interchangeably and, as such, may not be distinguishable.

Further, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for provisioning machine-to-machine (M2M) devices belonging to different M2M application domains, the method comprising:
    a server providing a preliminary M2M ID (PMI) associated with an M2M device;
    the server receiving the preliminary M2M ID (PMI) associated with the M2M device from an M2M service system that communicates with the M2M device;
    the server receiving from the M2M service system a key and a network identifier for the M2M service system;
    the server storing the network identifier for the M2M service system and the key in association with the preliminary M2M ID (PMI);
    the server, in response to a communication from the M2M device, establishing secure communication with the M2M device; and
    the server communicating the key and the network identifier for the M2M service system to the M2M device, the key and the network identifier for the M2M service system configured for the M2M device to establish secure communication with the M2M service system to receive an M2M ID (MI).

2. The method of claim 1, wherein receiving the preliminary M2M ID (PMI) from the M2M service system comprises receiving the preliminary M2M ID (PMI) over a secure channel.

3. The method of claim 2, wherein establishing secure communication with the M2M device comprises establishing a datagram transport layer security (DTLS) connection with the M2M device.

4. The method of claim 1, wherein establishing secure communication with the M2M device comprises establishing secure communications using credentials previously stored on the M2M device.

5. The method of claim 4, wherein the credentials previously stored on the M2M device comprise a key stored on the M2M device by a manufacturer.

6. A device associated with provisioning machine-to-machine (M2M) devices belonging to different M2M application domains, comprising:
    a processor with executable instructions that when executed cause the device to:
    provide a preliminary M2M ID (PMI) associated with an M2M device;
    receive the preliminary M2M ID (PMI) associated with the M2M device from an M2M service system that communicates with the M2M device;
    receive from the M2M service system a key and a network identifier for the M2M service system;
    store the network identifier for the M2M service system and the key in association with the preliminary M2M ID (PMI);
    establish, in response to a communication from the M2M device, secure communication with the M2M device; and
    communicate the key and the network identifier for the M2M service system to the M2M device, the key and the network identifier for the M2M service system configured for the M2M device to establish secure communication with the M2M service system to receive an M2M ID (MI).

7. The device of claim 6, wherein being configured to receive the preliminary M2M ID (PMI) from the M2M service system comprises being configured to receive the preliminary M2M ID (PMI) over a secure channel.

8. The device of claim 6, wherein being configured to establish secure communication with the M2M device comprises being configured to establish a datagram transport layer security (DTLS) connection with the M2M device.

9. The device of claim 6, wherein being configured to establish secure communication with the M2M device comprises being configured to establish secure communications using credentials previously stored on the M2M device.

10. The device of claim 9, wherein the credentials previously stored on the M2M device comprise a key stored on the M2M device by a manufacturer.

* * * * *